(12) United States Patent
Smintina et al.

(10) Patent No.: US 8,832,115 B2
(45) Date of Patent: Sep. 9, 2014

(54) RANKING REAL ESTATE BASED ON ITS VALUE AND OTHER FACTORS

(75) Inventors: Ioan Smintina, Sammamish, WA (US); Clement Ifrim, Sammamish, WA (US); Elena Petriuc, Redmond, WA (US); Mihai Petriuc, Redmond, WA (US)

(73) Assignee: Quantarium, LLC, Bellevue, WA (US)

( * ) Notice: Subject to any disclaimer, the term of this patent is extended or adjusted under 35 U.S.C. 154(b) by 286 days.

(21) Appl. No.: 13/331,505

(22) Filed: Dec. 20, 2011

(65) Prior Publication Data

US 2012/0158748 A1 Jun. 21, 2012

Related U.S. Application Data

(60) Provisional application No. 61/425,110, filed on Dec. 20, 2010.

(51) Int. Cl.
*G06F 7/00* (2006.01)
*G06F 17/30* (2006.01)
*G06Q 30/06* (2012.01)

(52) U.S. Cl.
CPC ............ *G06Q 30/0623* (2013.01); *G96Q 50/16* (2013.01)
USPC .......................................... 707/748; 707/751

(58) Field of Classification Search
CPC .................................................. G06F 17/3053
USPC ........................................... 707/748, 751, 946
See application file for complete search history.

(56) References Cited

U.S. PATENT DOCUMENTS 8,515,839 B2 *  8/2013  Ma et al. .......................... 705/35
8,527,428 B2 *  9/2013  Loveland ...................... 705/313

OTHER PUBLICATIONS

Spencer Williams, How do you calculate "Days on Market"?, Sep. 2007.*
Matcek Chris, Probability of Sale, Nov. 2008.*

* cited by examiner

*Primary Examiner* — Mariela Reyes
(74) *Attorney, Agent, or Firm* — Christensen O'Connor Johnson Kindness PLLC

(57) ABSTRACT

Real estate ranking computation is calculated to sort real estate properties. Such computations use available information regarding real estate properties in any local markets and may help the real estate buyer to identify real estate properties with various ranked financial values. Suitably, a relatively small geographic area can be used based on the real estate buyer's specified criteria, and the real estate ranking computation is able to handle interactions among predictor variables, possesses suitable predictive confidence, and includes the capability for dynamically adjusting the underlying ranking computation as new patterns of real estate market emerge over time.

18 Claims, 19 Drawing Sheets

| Position | Rank Score (Target rank) |
|---|---|
| 1 | 0.232 |
| 2 | 0.204 |
| 3 | 0.188 |
| 4 | 0.172 |
| 5 | 0.156 |

| Tentative Listing Price for Subject Property | Rank Score |
|---|---|
| $300,000 | 0.245 |
| $301,000 | 0.240 |
| $302,000 | 0.235 |
| $303,000 | 0.230 |
| $304,000 | 0.225 |
| $305,000 | 0.220 |
| $306,000 | 0.215 |
| $307,000 | 0.210 |
| $308,000 | 0.205 |
| $309,000 | 0.200 |
| $310,000 | 0.195 |
| $311,000 | 0.190 |
| $312,000 | 0.185 |
| $313,000 | 0.180 |
| $314,000 | 0.175 |
| $315,000 | 0.170 |
| $316,000 | 0.165 |
| $317,000 | 0.160 |
| $318,000 | 0.155 |
| $319,000 | 0.150 |

| Position | Target Rank | Suggested Listing Price | Rank Score for Subject Property at the Suggested Listing Price |
|---|---|---|---|
| 1 | 0.232 | $302,000 | 0.235 |
| 2 | 0.204 | $308,000 | 0.205 |
| 3 | 0.188 | $311,000 | 0.190 |
| 4 | 0.172 | $314,000 | 0.175 |
| 5 | 0.156 | $317,000 | 0.160 |

RANKING REAL ESTATE BASED ON ITS VALUE AND OTHER FACTORS

CROSS-REFERENCE TO RELATED APPLICATION

This application claims the benefit of Provisional Application No. 61/425,110, filed Dec. 20, 2010, which is incorporated herein by reference.

TECHNICAL FIELD

The present subject matter generally relates to software, and more particularly, it relates to ranking computations.

BACKGROUND

Today a buyer whois looking to purchase real estate properties uses a real estate web site and/or works with a real estate professional to identify real estate properties of interest from ones available on the market based on search criteria such as location, price range, number of bedrooms, number of bathrooms, lot size, age, and so on. The prospective buyer together with the real estate professional will then visit selected real estate properties. Eventually, the buyer may make a decision to make an offer on a real estate property. A valuation appraisal is then performed. The buyer together with his financial lender will eventually decide to close the transaction if the appraised value is consonant with the seller's price.

One shortcoming of the above process is that the buyer usually selects the real estate properties he wants to visit simply based on property features, without having a sense of the financial value of each selected real estate property relative to all other real estate properties in the marketplace. (Value, in this sense, is different from the price offered by the seller.) This lack of discernment is a result of the lack of suitable valuation tools to help the buyer and his real estate professional understand the financial values of real estate properties. As a result, the buyer may fail to find better real estate properties in the marketplace, and instead may proceed with real estate properties that have lackluster financial values.

SUMMARY

A method form of the present subject matter includes a method for ordering real estate properties. The method recites calculating a rank score for each real estate property based on its property value, trust factors, listing history, and local market trends. The method further recites sorting each real estate property in accordance with its rank score.

A system form of the present subject matter includes a system for ordering real estate properties. The system recites an estimated market value calculator configured to calculate real estate value. The system also includes a trust factors calculator configured to calculate confidence of the real estate value. The system additionally includes a history of the listing calculator configured to calculate the number of days on the market of a real estate property. The system further includes a rank score calculator configured to calculate a rank score for each real estate property based on calculations made by the estimated market value calculator, the trust factors calculator, and the history of the listing calculator.

A computer-readable medium form of the present subject matter includes a computer-readable medium having computer-executable instructions stored thereon for implementing a method for ordering real estate properties. The computer-readable medium recites calculating a rank score for each real estate property based on its property value, trust factors, listing history, and local market trends. The computer-readable medium further recites sorting each real estate property in accordance with its rank score.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIGS. 3A-3C are pictorial diagrams illustrating results from an archetypical reverse rank score calculation in accordance with various embodiments of the present subject matter;

DETAILED DESCRIPTION

Figure 1:
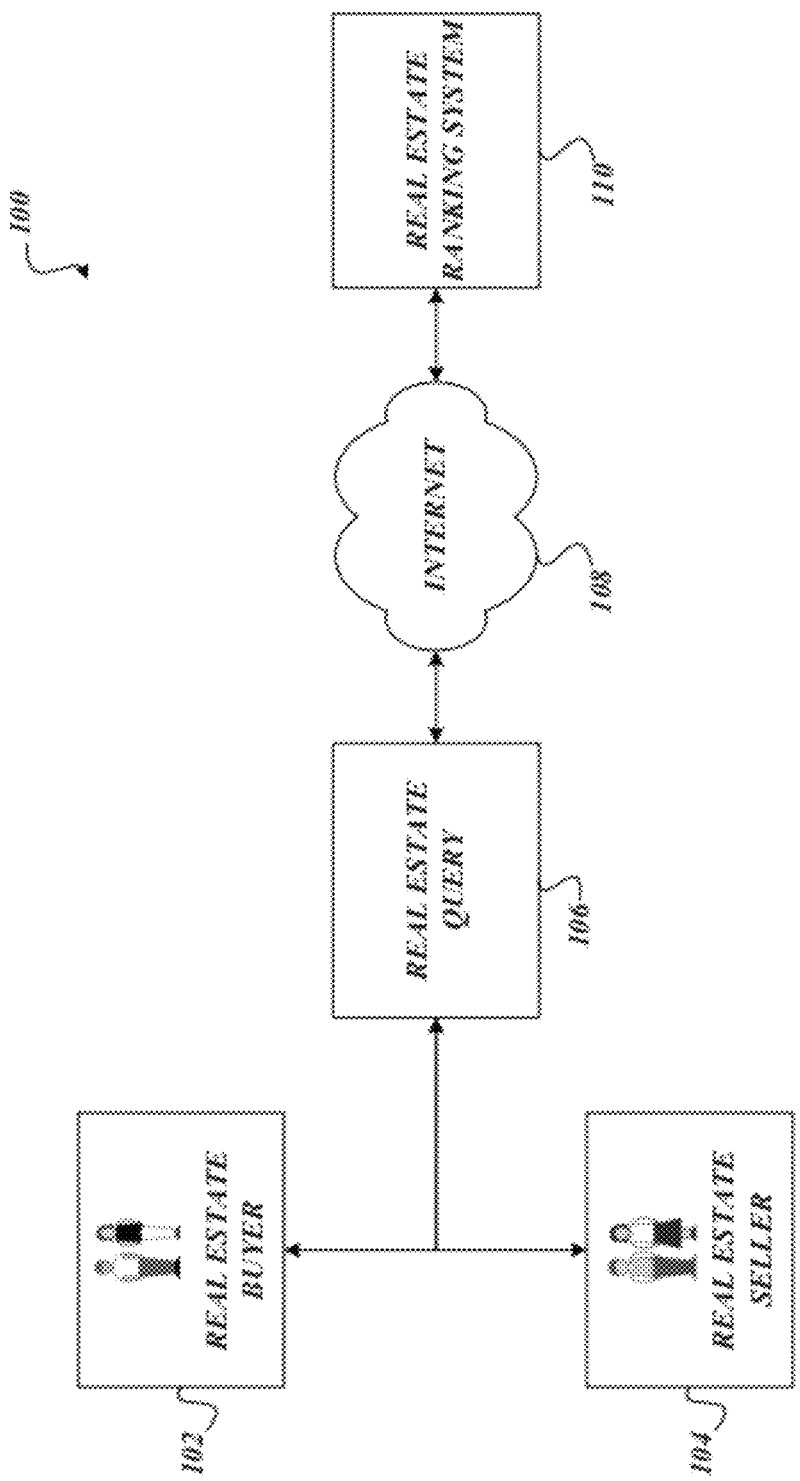
FIG. 1 is a block diagram illustrating pieces of an archetypical system configured to compute ranked real estate properties in response to queries of buyers and sellers of real estate properties in accordance with various embodiments of the present subject matter.

FIG. 1 illustrates pieces of hardware on which pieces of software are executed to implement a system 100 for facilitating a real estate buyer 102 or a real estate seller 104, as well as others, to find one or more real estate properties that are ranked via a real estate ranking system 110. The real estate buyer 102 and the real estate seller 104 may present a real estate query 106, which is communicated through the Internet 108, and received by the real estate ranking system 110. The real estate ranking system 110 finds one or more desired real estate properties and ranks them in accordance with various calculable factors including the financial value or equity of the one or more real estate properties as well as traditional factors such as location, price range, number of bedrooms, number of bathrooms, lot size, age, and so on.

Other calculable factors relied on by the real estate ranking system 110 include trust factors that are indicative of the confidence of financial value or equity; history of the listing, which is dependent on the number of days a real estate property has been on the market and whether there were any changes in its listing price; local market trends, such as the number of days on the market, inventory velocity, price trends, and so on; relevancy for the user; and community features, such as conditions of schools as well as demographic, economic, and cultural factors.

The executed pieces of software on the hardware of the system 100 also facilitate, in a few embodiments, a method for determining a rank of a subject real estate property within a selected subset of real estate properties on the market. That determination is made after the method receives user input for an address of the subject real estate property and a tentative list price and further after the method receives user input for selection criteria for a subset of real estate properties (or defined market) within which the subject real estate property is to be ranked (be it within 5 miles, same zip code, same city, and so on). The method calculates a rank score for each real estate property in the subset and proceeds to order them into a list. The method further calculates the rank score for the subject real estate property and inserts it into a position in the order list in which it is ranked.

The executed pieces of software also facilitate the generation of suggested listing prices for real estate properties in some embodiments. In other embodiments, the executed pieces of software facilitate a visual method to allow the real estate buyer 102 or the real estate seller 104 to compare a subject property relative to a ranked list of real estate properties. Such a comparison is made possible by the insertion of the subject real estate property into the ordered list of subset real estate properties, as discussed above. Then, the comparison is made by displaying suggested listing prices of the subject real estate property for each ranking position in the ordered list.

The executed pieces of software, in additional embodiments, also facilitate a calculation of a probability that a real estate property is likely to be sold within a specific time interval. Such a calculation is made by determining the rank of the real estate property and then using historical data for number of days on the market for properties which ranked in similar positions at the time of sale in order to determine the probability. The executed pieces of software also facilitate, in another embodiment, the use of an automated real estate system that relies on valuation modeling in combination with other data to rank real estate properties offered for sale in a certain market. The executed pieces of software, in a few embodiments, use user input, such as the fact that a kitchen was remodeled, a new roof was installed, the house was expanded, and so on, to refine the rank score of a real estate property. The executed pieces of software, in a further embodiment, may use user feedback, such as click counts, activities on a web site, and so on, to refine the rank score of a real estate property. The executed pieces of software, in an additional embodiment, facilitate the use of the profiles of the real estate buyer 102 and the real estate seller 104 to customize the ranking process. The executed pieces of software, in as yet another embodiment, facilitate the use of foreclosure data to customize the ranking process. The executed pieces of software, in many embodiments, facilitate a group of notification systems (such as e-mail, smartphone apps, and so on) to inform various interested parties (such as agents, buyers, investors, and so on) of the new ranking or new suggested listing prices of real estate properties which reflect market movements.

Thus, the system 100 described above focuses on real estate ranking computations. The system 100 uses available information regarding real estate properties in any local markets and may help the real estate buyer 102 to identify real estate properties with various ranked financial values. Suitably, in those embodiments, a relatively small geographic area can be used based on the real estate buyer 102's specified criteria, and the real estate ranking computation is able to handle interactions among predictor variables, possesses suitable predictive confidence, and includes the capability for dynamically adjusting the underlying ranking computation as new patterns of real estate market emerge over time. Using such information, the real buyer 102 may be guided to choose a real estate property from a pool of ranked real estate properties based on calculable factors aside from the traditional factors.

The system 100 also facilitates a "what if" scenario in which the real estate seller 104 enters a hypothetical listing price for a subject real estate property and various embodiments predict a rank of the subject real estate property among all other real estate properties that are available in a local market. Similarly, various embodiments facilitate an alternate "what if" scenario in which the real estate seller 104 enters a hypothetical listing price for a subject real estate property and various embodiments predict a time interval in which the subject real estate property would be sold among all other real estate properties that are available in the local market using various statistical measures to calculate the selling probability. Alternatively, the real estate seller 104 enters a desired time interval in which the subject property is desired to be sold, and various embodiments calculate a hypothetical price that may facilitate such a transaction, which may be attended by a statistical confidence interval. Furthermore, an additional "what if" scenario is available in which the real estate seller 104 enters a desired rank for a subject real estate property and various embodiments calculate a hypothetical listing price for which the subject real estate property would be ranked within a certain range of ranked real estate properties given certain search criteria.

Figure 2:
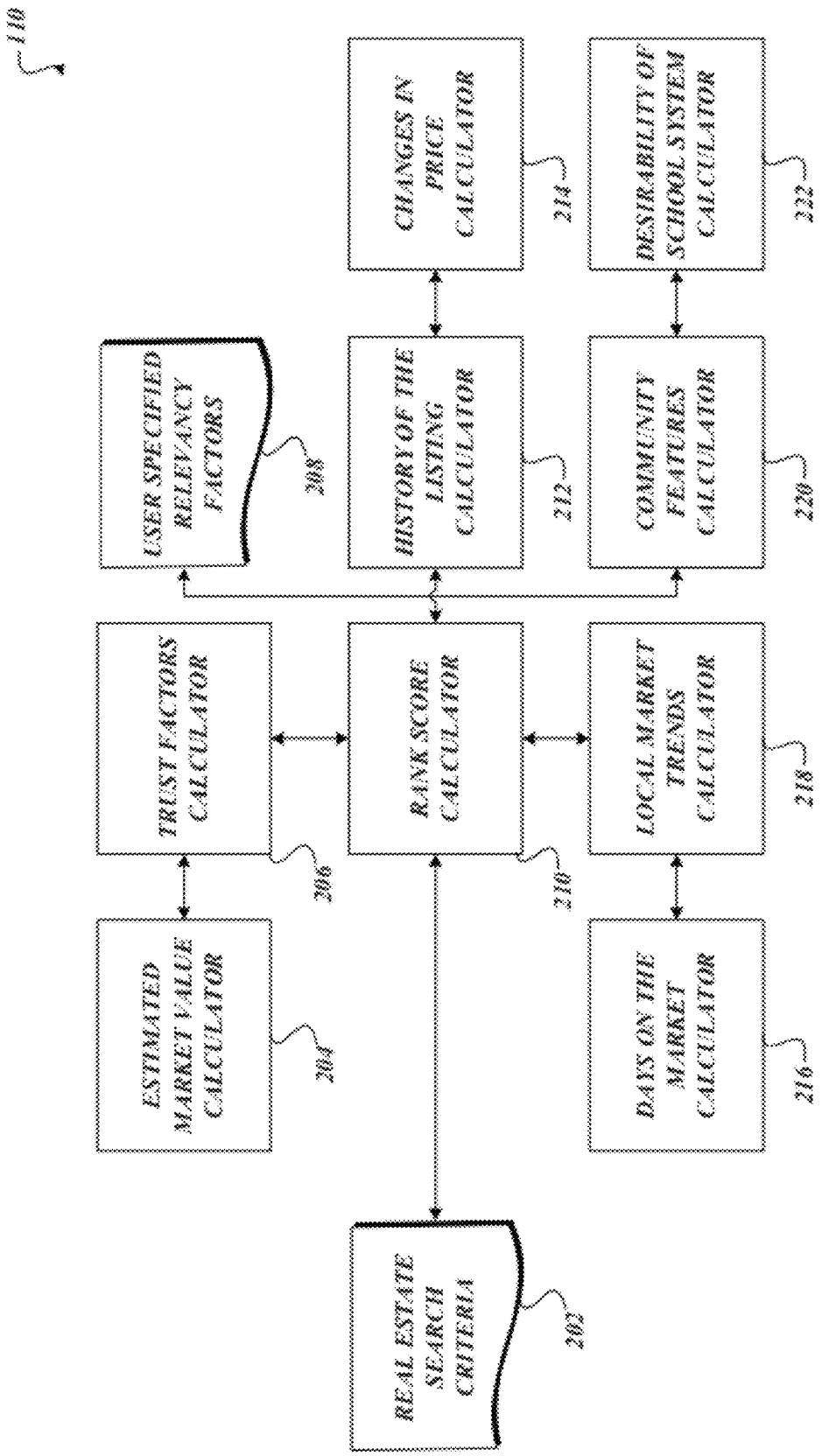
FIG. 2 is a block diagram illustrating various calculators configured to assist an archetypical rank score calculator to compute a rank score for a real estate property in accordance with various embodiments of the present subject matter.

FIG. 2 illustrates the real estate ranking system 110 in greater detail. Calculators are used to produce various calculations. One skilled in the art would understand that calculators are computing machinery on which pieces of software can be executed to produce various calculations. Real estate search criteria 202 are extracted from the real estate query 106 that is provided by either the real estate buyer 102 or the real estate seller 104. The real estate search criteria 202 are used to find one or more real estate properties prior to their ranking computations by the real estate ranking system 110. A rank score calculator 210 is the essence of the real estate ranking system 110 and can be actuated to calculate a rank score for a real estate property found by executing on the real estate search criteria 202.

In the calculation of the rank score for the real estate property by the rank score calculator 210, an estimated market value calculator 204 is actuated to estimate a financial value or equity of the real estate property. One skilled in the art would understand that such a value can be the same or different from a listing price of the same real estate property. A trust factor calculator 206 is also actuated to calculate the confidence measures of accuracy of the estimated market value for the real estate property calculated by the estimated market value calculator 204. These calculations are presented to the rank score calculator 210 for calculating the rank score for the real estate property.

Other calculations may also be presented to the rank score calculator 210: A history of the listing calculator 212 can be actuated to determine how long the piece of real estate has been on the market and such a calculation is then presented to the rank score calculator 210. Such a calculation may not necessarily be a constant, but could be a function based on other factors. For example, the calculation of the history of the listing may be based on specific price ranges for different local markets. The fact that the real estate property has been available on the market for many days does not necessarily result in a negative calculation—at least not until it reaches an undesirable threshold, such as the average days on market for sold properties in the market of interest.

The history of the listing calculator 212 may also be influenced by a calculation produced by changes in a listing price as calculated by a changes in price calculator 214. In one embodiment, the changes in price calculator 214 calculates a ratio between an original listing price of the real estate property and a current list price of the same real estate property. To explain, a real estate property, which has been available on the market for many days but whose listing price is continuously declining below certain thresholds may avoid having its rank score penalized based on the calculation provided by the changes in price calculator 214 (even though the calculation of the history of the listing calculator 212 alone may indicate that the rank score of the real estate property ought to be negatively affected).

A local market trends calculator 218 calculates geographically contextual pieces of information which are presented to the rank score calculator 210 for further refining the rank score for the real estate property. For example, a days on the market calculator 216 calculates days on the market for the real estate property in a particular geography of a particular local real estate market. Other local market trends that are calculated by the local market trends calculator 218 include inventory velocity, price trends, and so on. A user specified relevancy factor 208 may also be presented to the rank score calculator 210 to further refine the rank score of the real estate property. For example, the real estate buyer 102 may specify how large a role the calculations of the estimated market value calculator 204 will contribute to the rank score calculation performed by the rank score calculator 210. Other suitable specifications are possible besides the calculations of the estimated market value calculator 204. A community features calculator 220 calculates other pieces of information that may additionally refine the rank score of the real estate property. For example, a desirability of school system calculator 222 calculates a quantifiable number that refines the rank score of the real estate property depending on the conditions of the school system in a particular geography in which the real estate property is located. Other community features calculated by the community features calculator 220 include demographics, economics, cultural factors, and so on.

FIGS. 3A-3C illustrate matrixes in the form of tables that help to explain a process, explained in detail below, by which a reverse calculation of rank score produces a suggested listing price for a real estate property. This may be helpful to the real estate seller 104 who knows the desired ranking of his real estate property for listing purposes but is uncertain how much to price his real estate property so that it may attract attention by one or more real estate buyers 102. More specifically, a suggested listing price for each ranking position on a list is determined as an approximate price of the maximum listing price for which the real estate property gets a rank higher than a target rank (which is the rank of the real estate property currently in that position). These suggested listing prices can be determined by computing the rank for the real estate property for tentative listing prices in rounded increments (such as $1000) and searching in this list of tentative listing prices for a first rank value which is higher than then target rank.

FIG. 3A illustrates a table 302 with columns and rows. The first column is titled "Position" and is indicative of a ranking of real estate properties on the market, each of which has corresponding rank scores in the second column titled "Rank Score (Target rank)". The first row includes the titles of each of the two columns as discussed. The second row contains the first real estate property with the highest ranking "1" and a corresponding rank score of "0.232". The third row contains a secondly ranked real estate property at position "2" and a corresponding rank score of "0.204". The fourth row contains a thirdly ranked real estate property having position "3" and a corresponding rank score "0.188". The fifth row contains the real estate property in ranked position "4" and a corresponding rank score "0.172". The sixth row contains the real estate property in position "5" and a corresponding rank score in the second column of "0.156". These five rows of real estate properties provide calculation seeds which are then mathematically expanded by the calculations illustrated by a table 304 of FIG. 3B.

The table 304 illustrated by FIG. 3B also has two columns. The first row lists the titles of each of the columns, the first column being "Tentative Listing Price for Subject Property" and the second column being titled "Rank Score". The table 304 contains computations of rank scores in one thousand dollar increments. The second row, for example, shows a tentative listing price of "$300,000" for a corresponding rank score in the second column of "0.245". The last row of the table 304 shows a tentative listing price of "$319,000" for a corresponding rank score in the second column of "0.150". Thus, for each $1000 increment in the tentative listing price is a corresponding calculated rank score. From the rank scores of the table 304, a software process can be executed to find the closest maxima for the rank scores of the table 302, and corresponding suggested listing prices can be found. See table 306 of FIG. 3C.

FIG. 3C illustrates the table 306 that shows suggested listing prices for the five real estate properties listed in the table 302. See FIG. 3A. The first row illustrates titles for the four columns, the first column being titled "Position", the second column being titled "Target Rank", the third column being titled "Suggested Listing Price", and the last column being titled "Rank Score for Subject Property at the Suggested Listing Price". Illustratively, the second row shows a piece of real estate with a ranked position "1", a corresponding target rank score of "0.232", a corresponding suggested listing price of "$302.000", and a rank score of "0.235". The last row of the table 306 shows a real estate property in ranked position "5" with a target rank score "0.156", a suggested listing price of "$317,000", and a rank score of "0.160" in the last column. Thus, depending on the desired ranking for a real property in the five positions of table 302, the system 100 may provide a suitable suggested listing price for the real property estate to the real estate seller 104.

Figure 4:
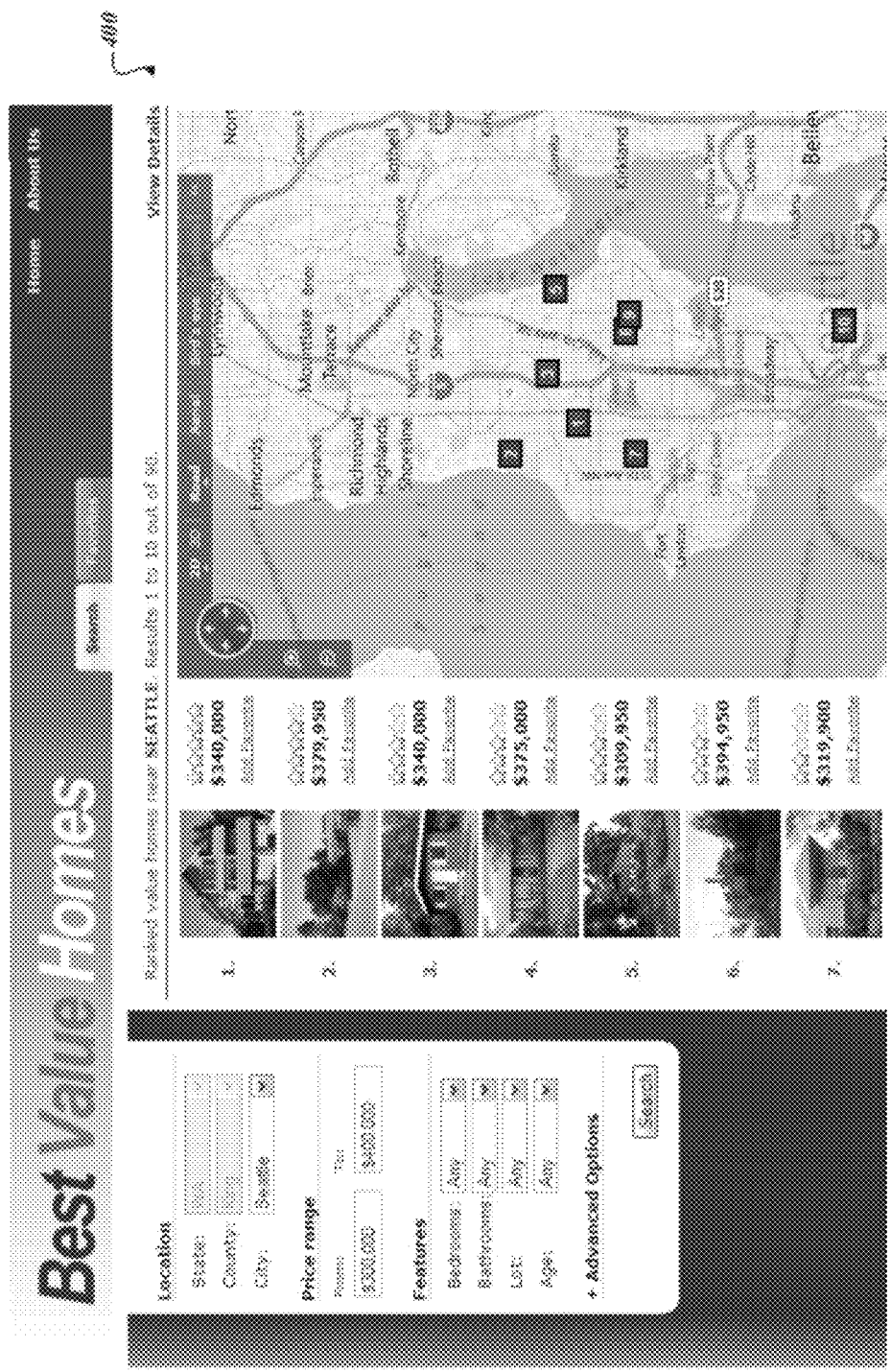
FIG. 4 is a pictorial diagram illustrating an archetypical user interface for a buyer to find a real estate property in accordance with various embodiments of the present subject matter.

FIG. 4 illustrates an archetypical user interface 400 that is presented to real estate buyer 102. The user interface 400 is divided into three sections. The first section is a banner that appears horizontally at the top of the user interface 400 and includes two tabs, one tab being titled "Search" (shown), and the other tab being titled "Favorites" (not shown). There are other hyperlinks that lead the real estate buyer 102 to a home page, by selecting a "Home" hyperlink, or to additional information, by selecting an "About Us" hyperlink. The leftward section of the user interface 400 is where real estate buyers 102 may enter search criteria to find one or more real estate properties of interest. One type of search criteria includes an area titled "Location" at which the real estate buyer 102 may specify the state, the county, and even the city. Each of these search criteria may be selected from a drop-down menu.

Another type of search criteria that is available to the real estate buyer 102 is in an area titled "Price range." One dialog box titled "From:" allows the real estate buyer 102 to enter a minimum price for one or more real estate properties of interest. Another dialog box titled "To:" allows the real estate buyer 102 to enter a maximum price for one or more real estate properties of interest. An additional type of search criteria includes those collectively listed under an area titled "Features". The number of bedrooms may be specified through a drop-down menu. The number of bathrooms can be similarly specified. Lot sizes can also be specified through another drop-down menu. The age of a structure on one or more real estate properties of interest can also be specified via an additional drop-down menu. Further advanced options may be specified as well in an area titled "Advanced Options."

When the real estate buyer 102 is ready to search, he selects a button titled "Search" in the leftward section of the user interface 400 to cause the system 100 to proceed to find one or more real estate properties that match the specified search criteria. The system 100 then sorts the found real estate properties in a ranked order according to the rank scores of the found real estate properties.

The rightward area of the user interface 400 displays the found real estate properties in two representations, an ordered list and a map. Above the two representations, there is a textual explanation of what was found. For example, a textual phrase "Ranked value homes near SEATTLE. Results 1 through 10 out of 90" explains that the found real estate properties are found in the City of Seattle, Wash., which is in King County, as specified search criteria. The current web page displays ten real estate properties but ninety real estate properties were found. Traversal to the remaining eighty real estate properties is accomplished by navigating to other web pages via suitable hyperlinks (not shown).

The map representation displays found real estate properties on a map. Each real estate property is numbered with a number that is indicative of its ranking using its rank score. Next to the map representation is a list representation which displays a list of found real estate properties ordered and numbered in accordance with their ranking using their rank scores. Each real estate property in the list representation includes a representative picture of the real estate property. A listing price appears next to the picture. Above the listing price is a star representation which coarsely quantifies the desirability of the corresponding real estate property by various other factors that may be orthogonal to the ranking of the corresponding real estate property. A hyperlink titled "Add Favorite" is present, which when selected, adds the corresponding real estate property to a favorite list. These favorite real estate properties may be accessed by selection of the tab titled "Favorites" at the top of the user interface 400.

Figure 5:
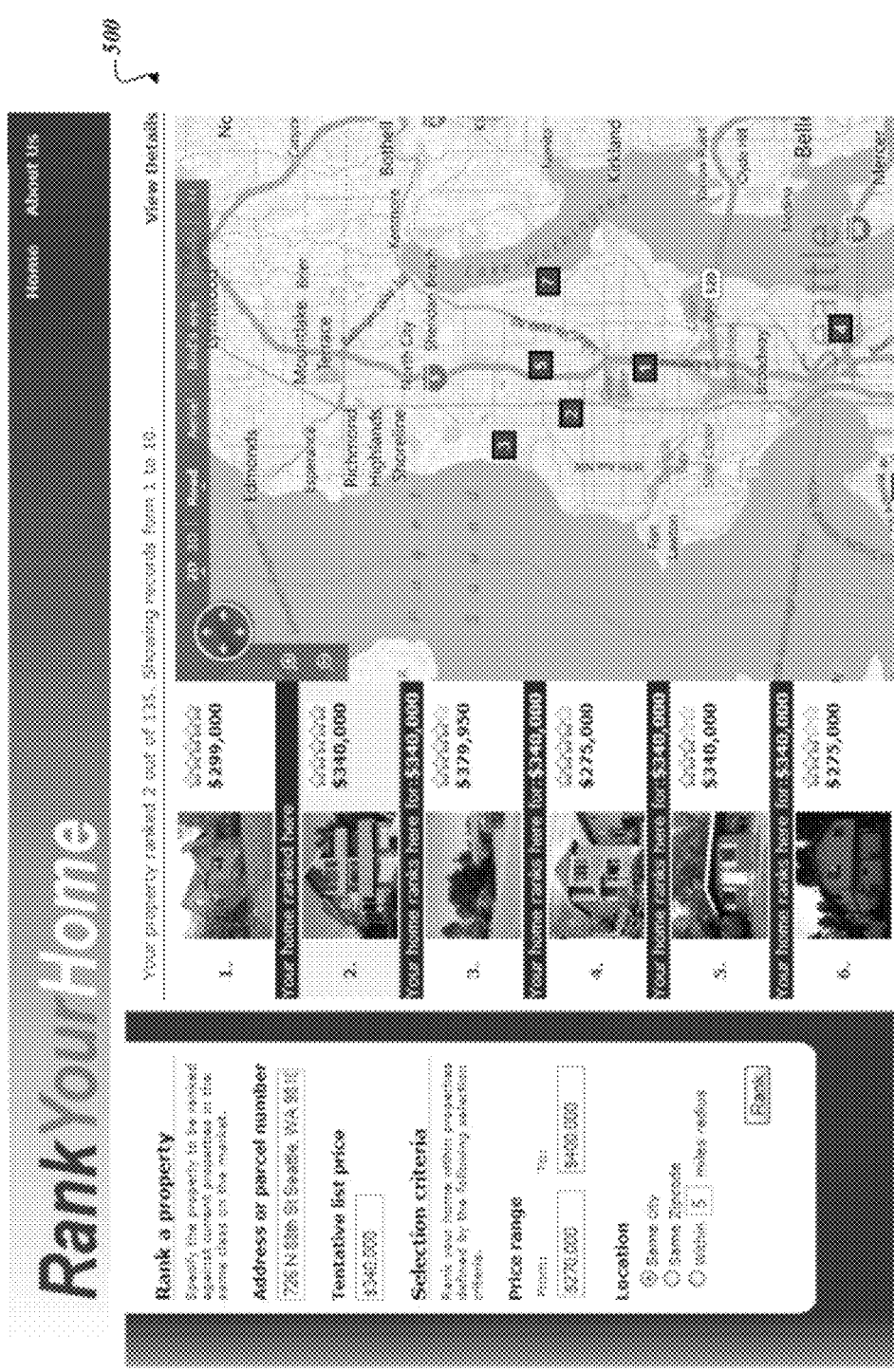
FIG. 5 is a pictorial diagram illustrating an archetypical user interface for presenting a ranked subject real estate property among other ranked real estate properties based on a hypothetical listing price in accordance with various embodiments of the present subject matter.

FIG. 5 illustrates a user interface 500 that is typically accessed by the real estate seller 104. Upon accessing, the user interface 500 is presented in three major sections. The first section is a banner across the top of the user interface 500. A few hyperlinks afford access to other web pages, such as the hyperlink titled "Home" and another hyperlink titled "About Us". The second section is leftward allowing the real estate seller 104 to enter search criteria to rank a real estate property. Textual instructions at the top of the second section titled "Rank a property" provide insights into its usage: "Specify the property to be ranked against current properties in the same class on the market."

A dialog box titled "Address or Parcel Number" allows the real estate seller 104 to enter an address or a parcel number so as to allow the system 100 to find the real estate property of interest. A second dialog box titled "Tentative List Price" allows the real estate seller to enter a hypothetical list price of the subject real estate property. Additional search criteria may be entered via the section titled "Selection Criteria," which provides textual instructions: "Rank your home within properties defined by the following selection criteria." One type of selection criteria includes price range in an area titled "Price range" which has two dialog boxes. One dialog box titled "From:" allows the real estate seller to enter a minimum listing price to select. The other dialog box titled "To:" allows the real estate seller to enter the maximum listing price to select. Additional selection criteria include an area titled "Location," which presents several radio buttons. One radio button is titled "Same City," another radio button is titled "Same Zip Code," and another radio button is titled "Within X Miles Radius," where X can be specified by the real estate seller. When the real estate seller is ready to allow the real estate ranking system 110 to execute, he selects a button titled "Rank" to execute.

The third section of the user interface 500 is presented rightward. At the top is information regarding the ranked order of the found real estate property and the number of records. For example, at the top of the user interface 500 are two sentences: "Your Property Ranked 2 Out of 135. Showing Records From 1 to 10." Below the top is a map on which found real estate properties are presented in numerical form, each number corresponding to a ranked order taken from a list of ranked real estate properties appearing leftward in the first section. Each real estate property is ranked according to its rank score and is numerically identified in a list representation next to the map. The listing price of a real estate property that is currently on the market is presented to the right of a photograph of the real estate property. A star system that coarsely quantifies the desirability of the piece of real estate is also presented above the listing price. A textual indication of where the subject real estate property is ranked is set off from other found real estate properties. Additionally, the user interface 500 indicates at each ranking order that should the subject real estate property be re-priced, it would be re-ranked at a corresponding order.

Figure 6A:
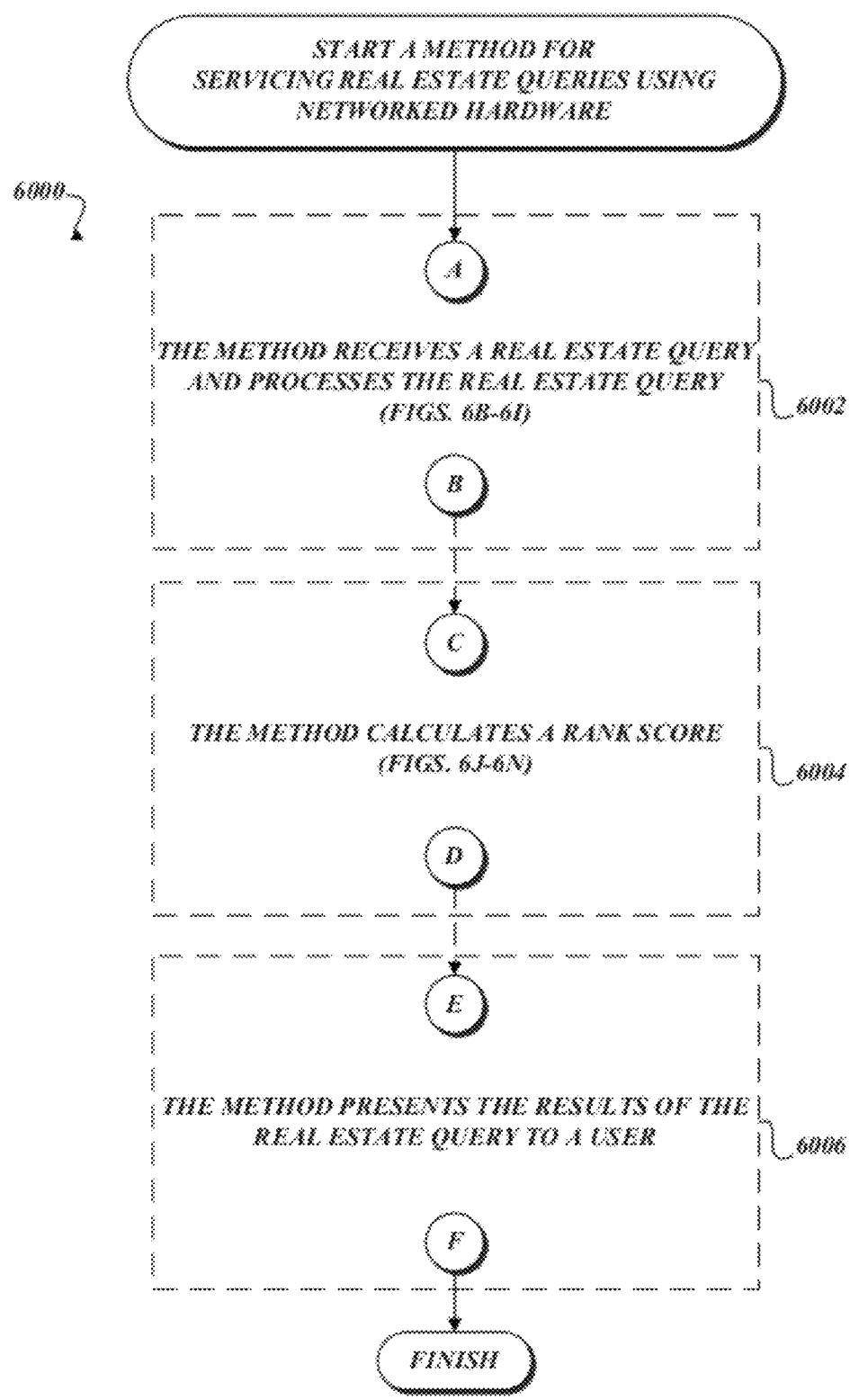
FIG. 6A-6N are process diagrams illustrating an archetypical software method for servicing real estate queries using network hardware in accordance with various embodiments of the present subject matter.
Figure 6B:
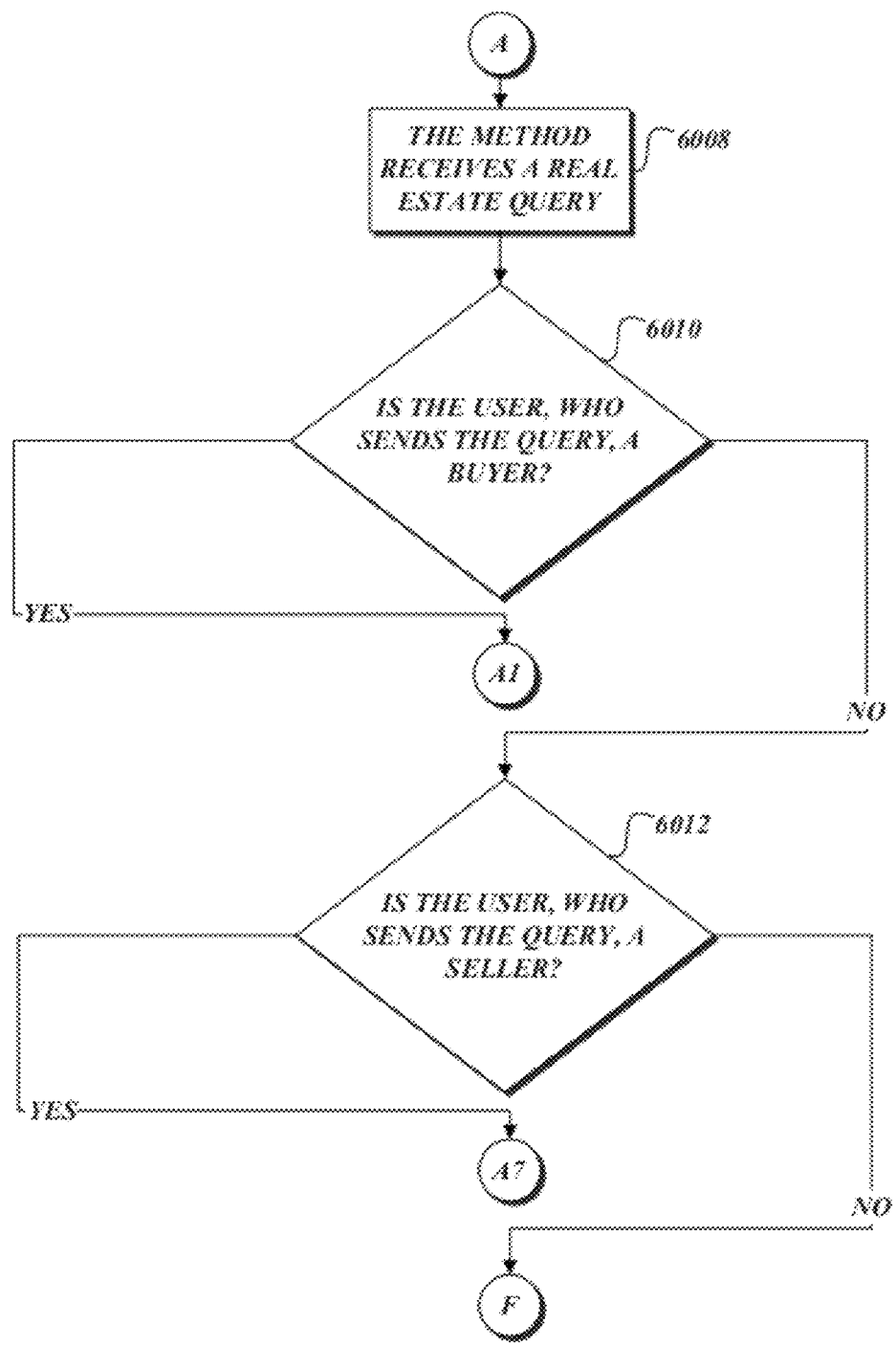
Figure 6C:
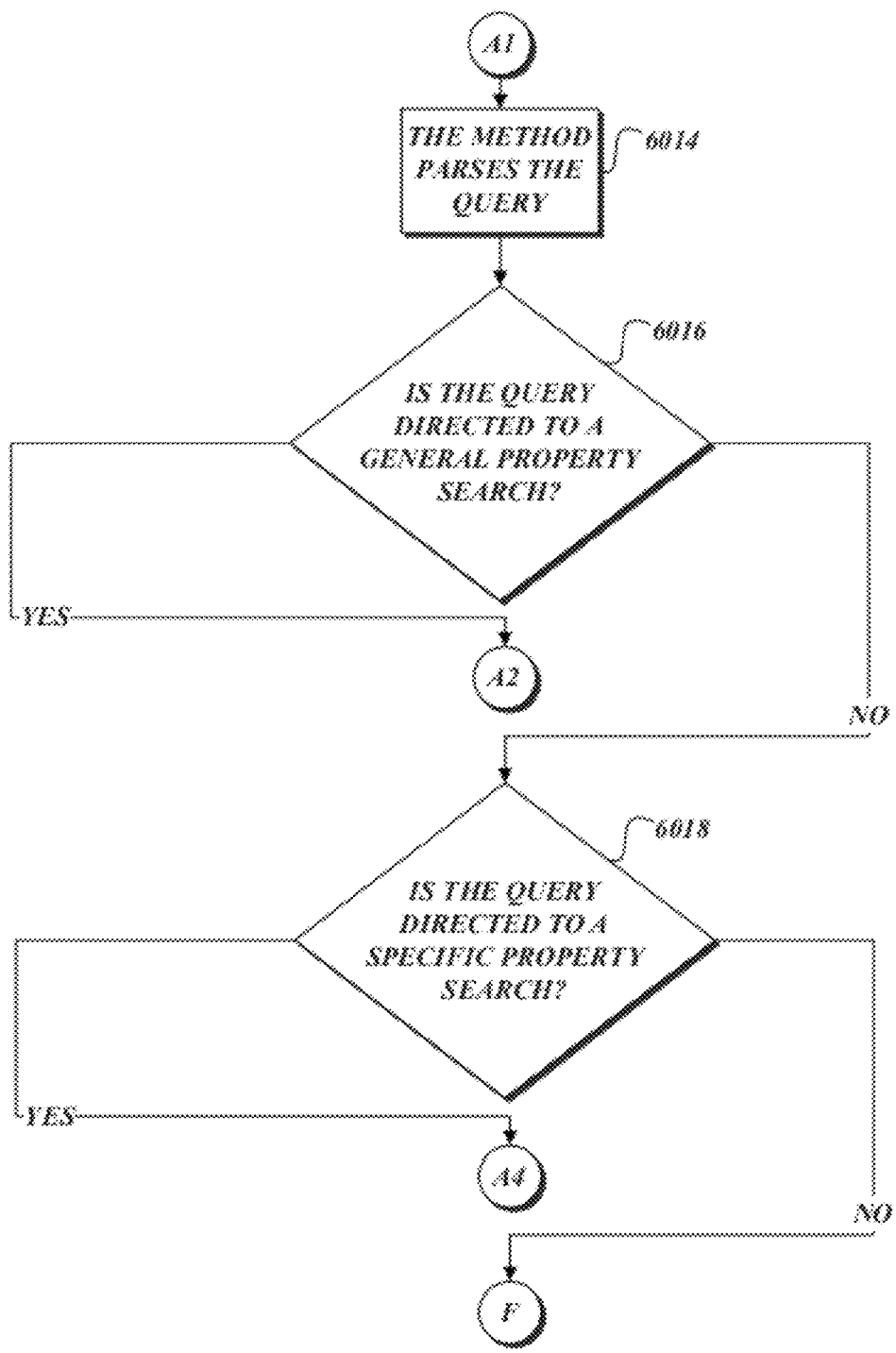
Figure 6D:
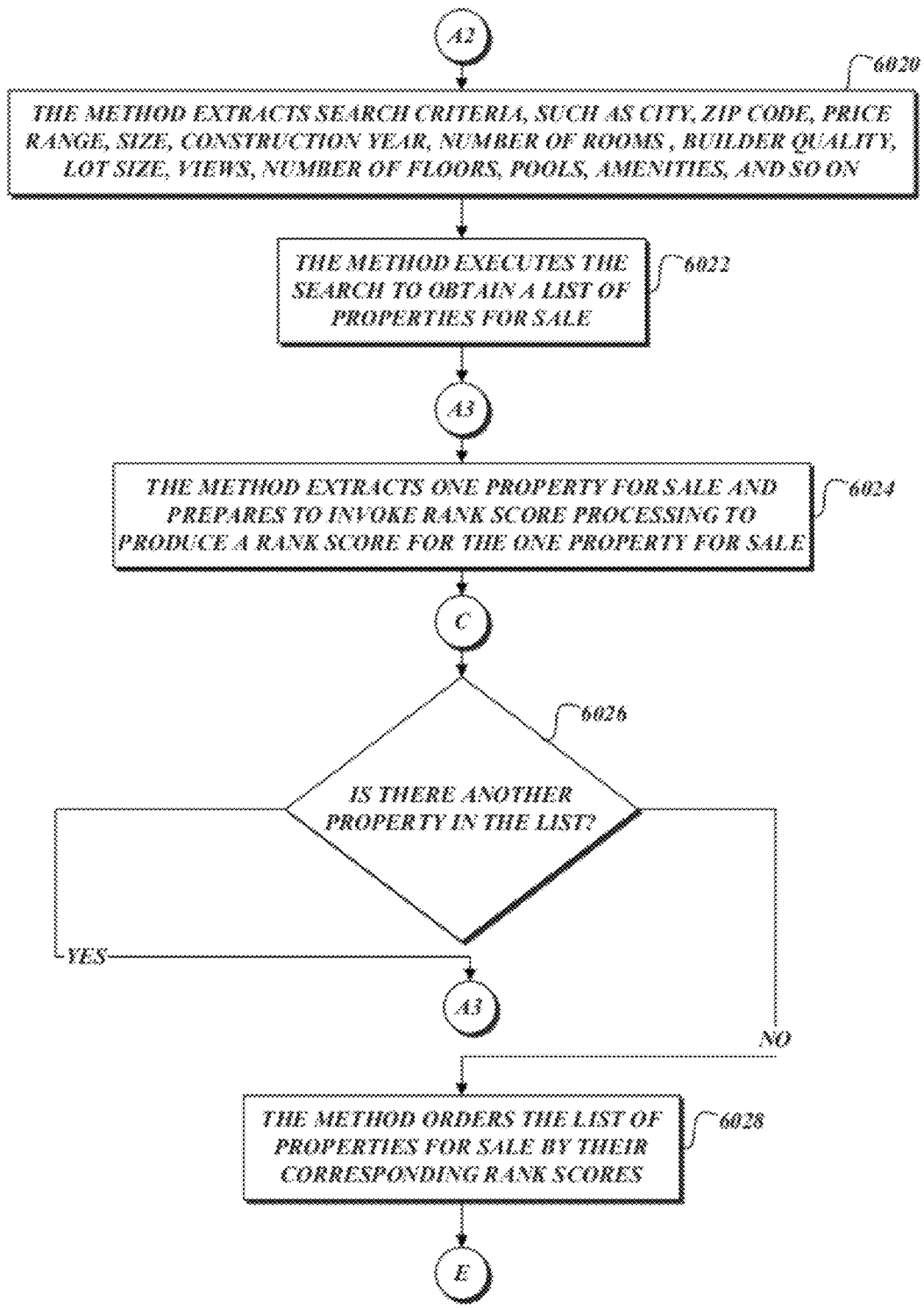
Figure 6E:
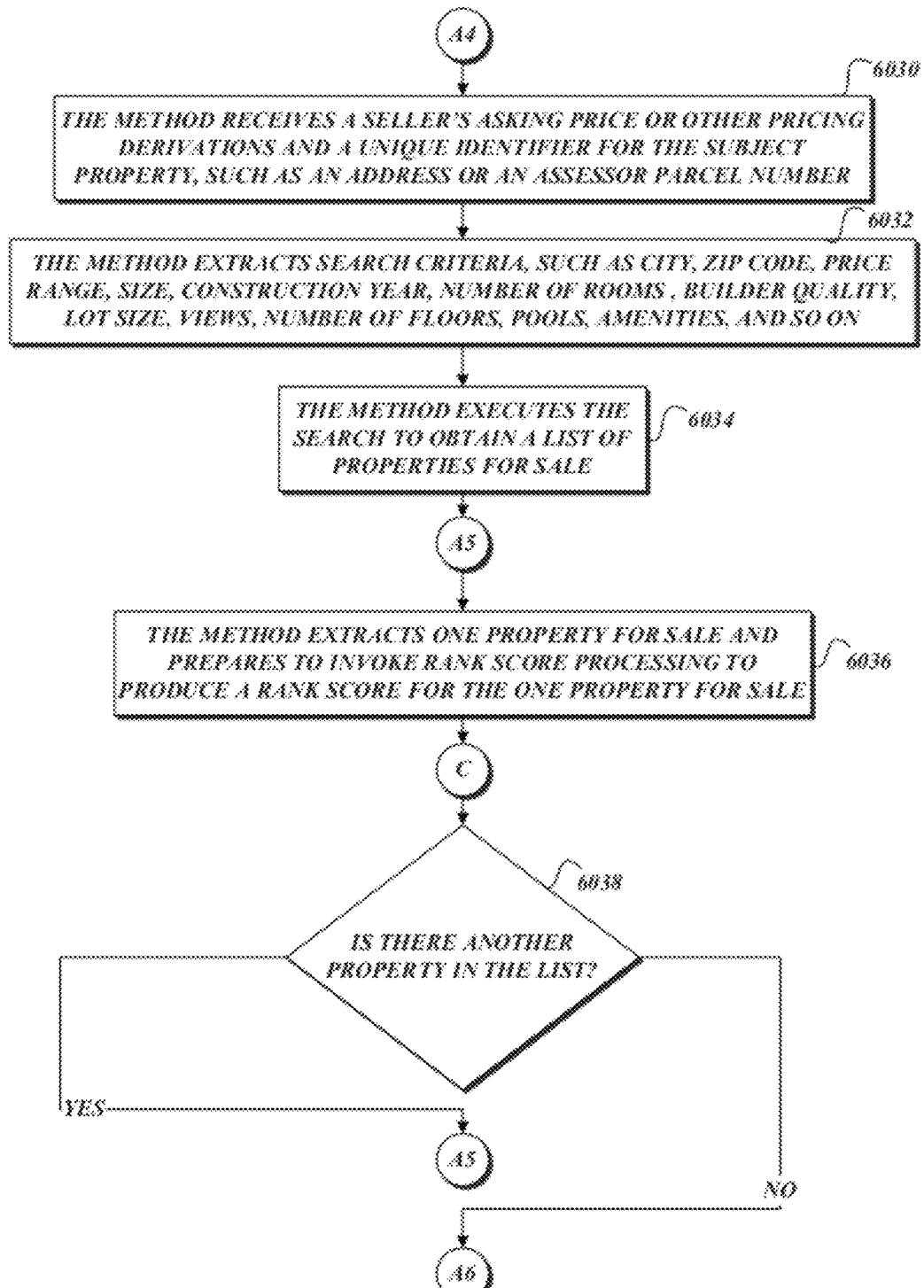
Figure 6F:
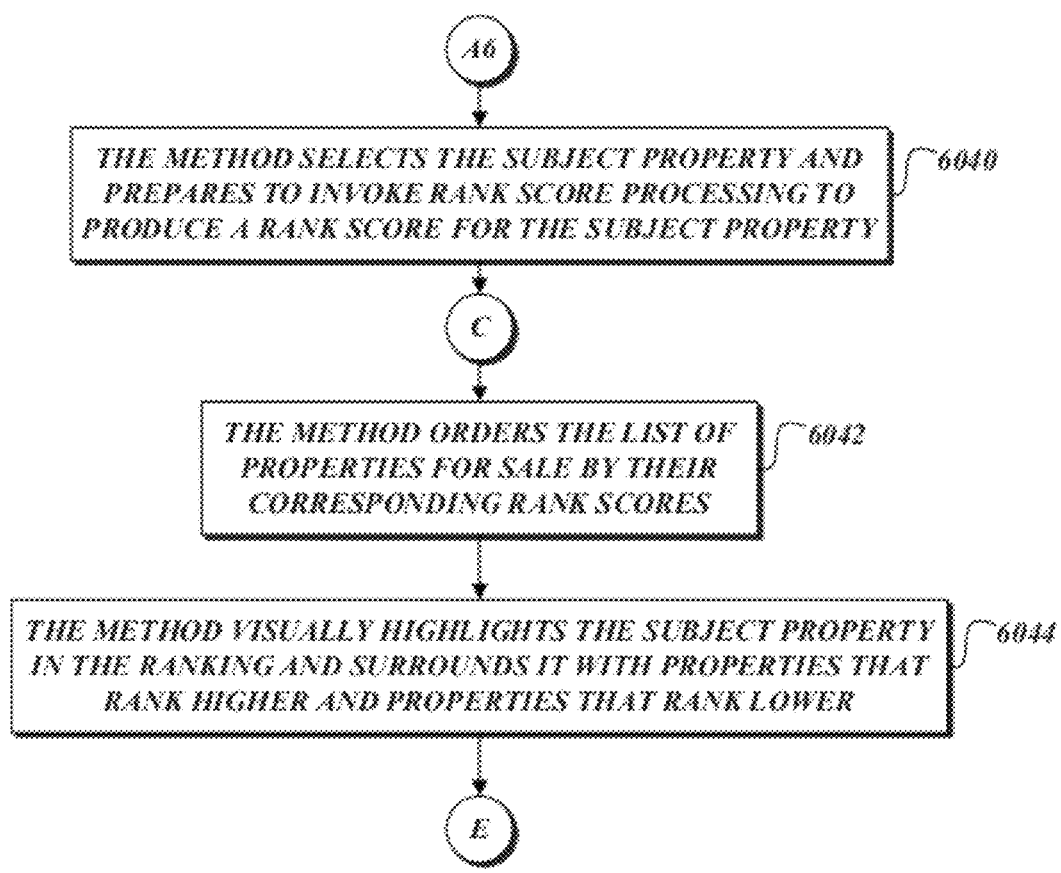
Figure 6G:
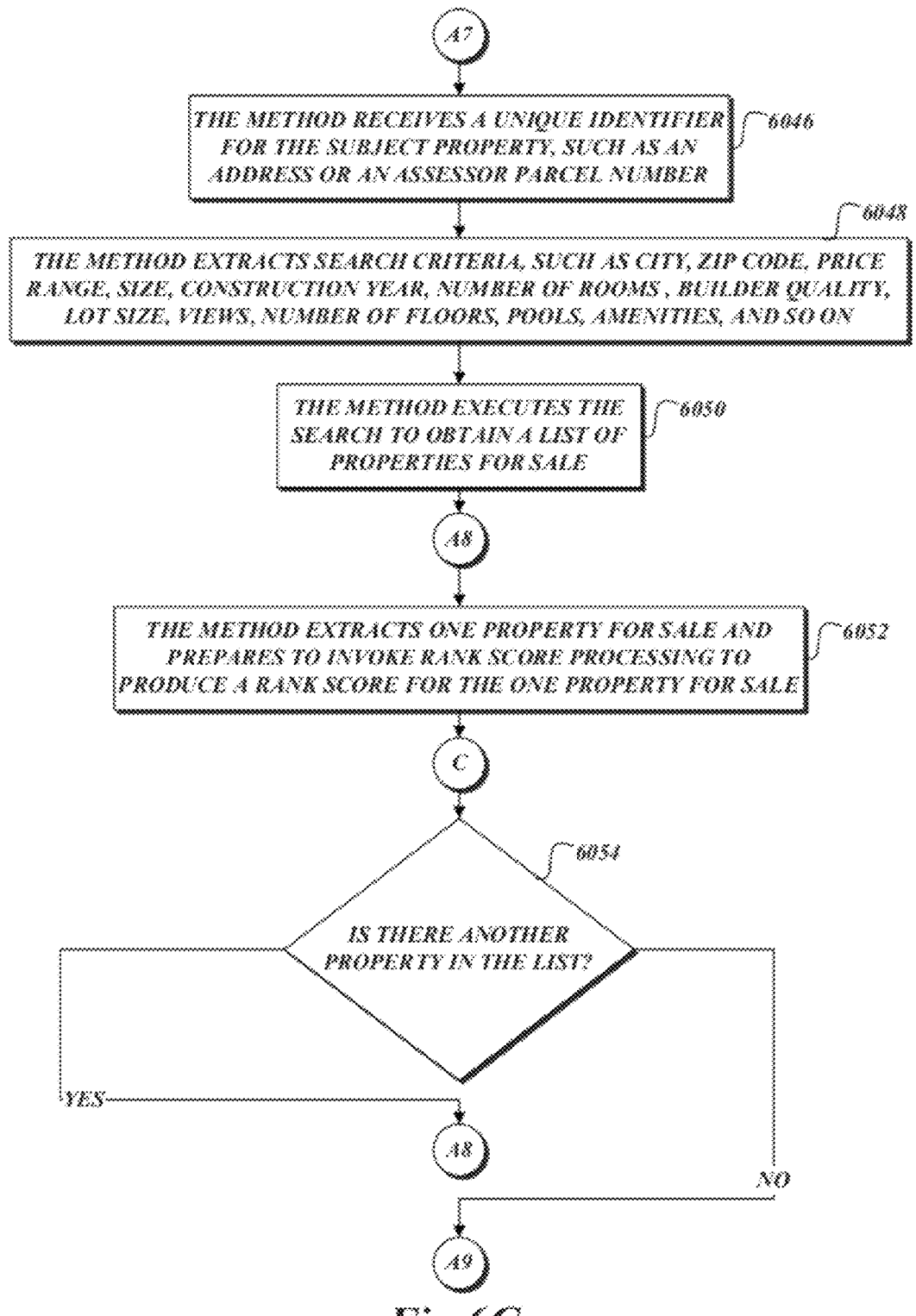
Figure 6H:
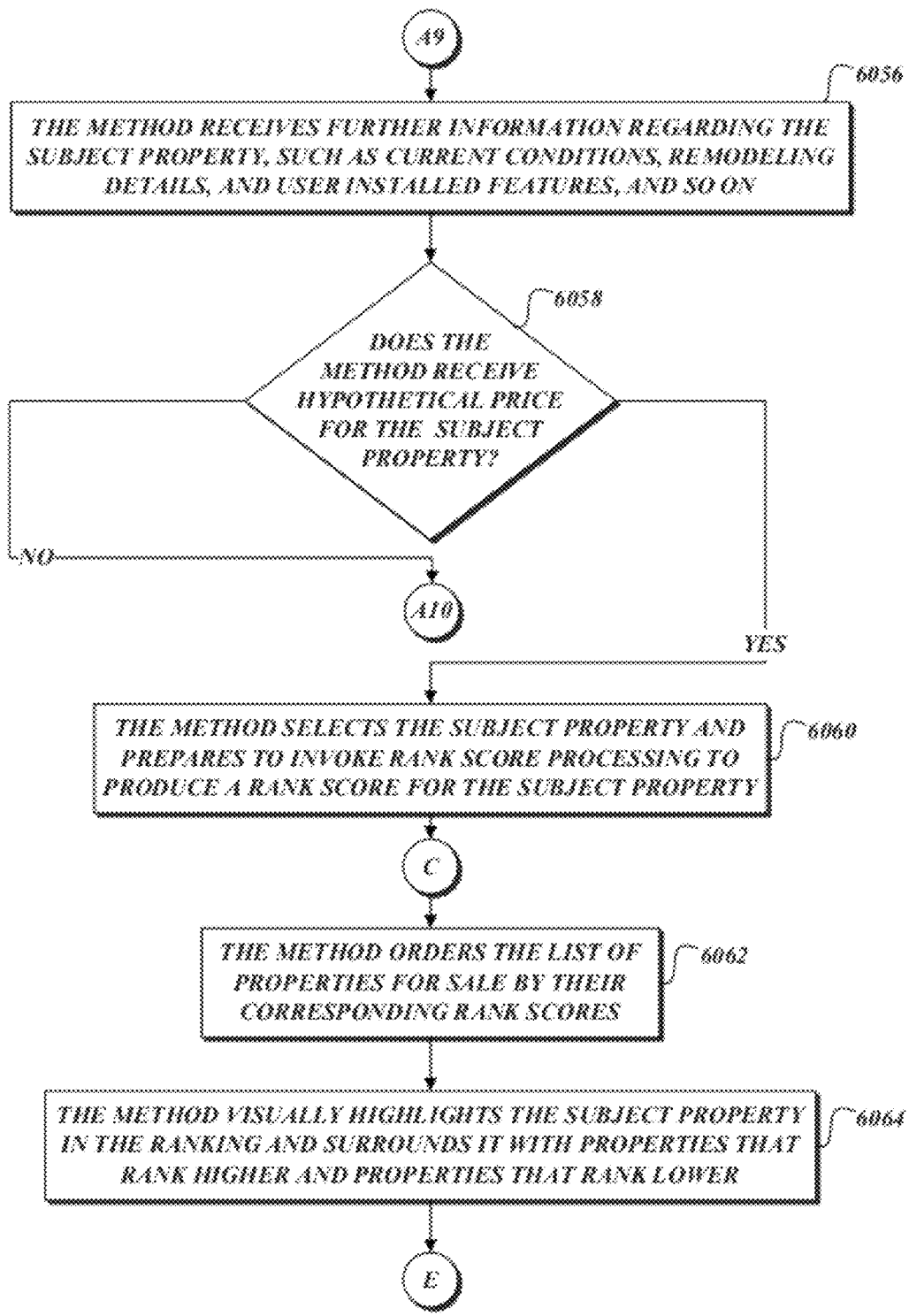
Figure 6I:
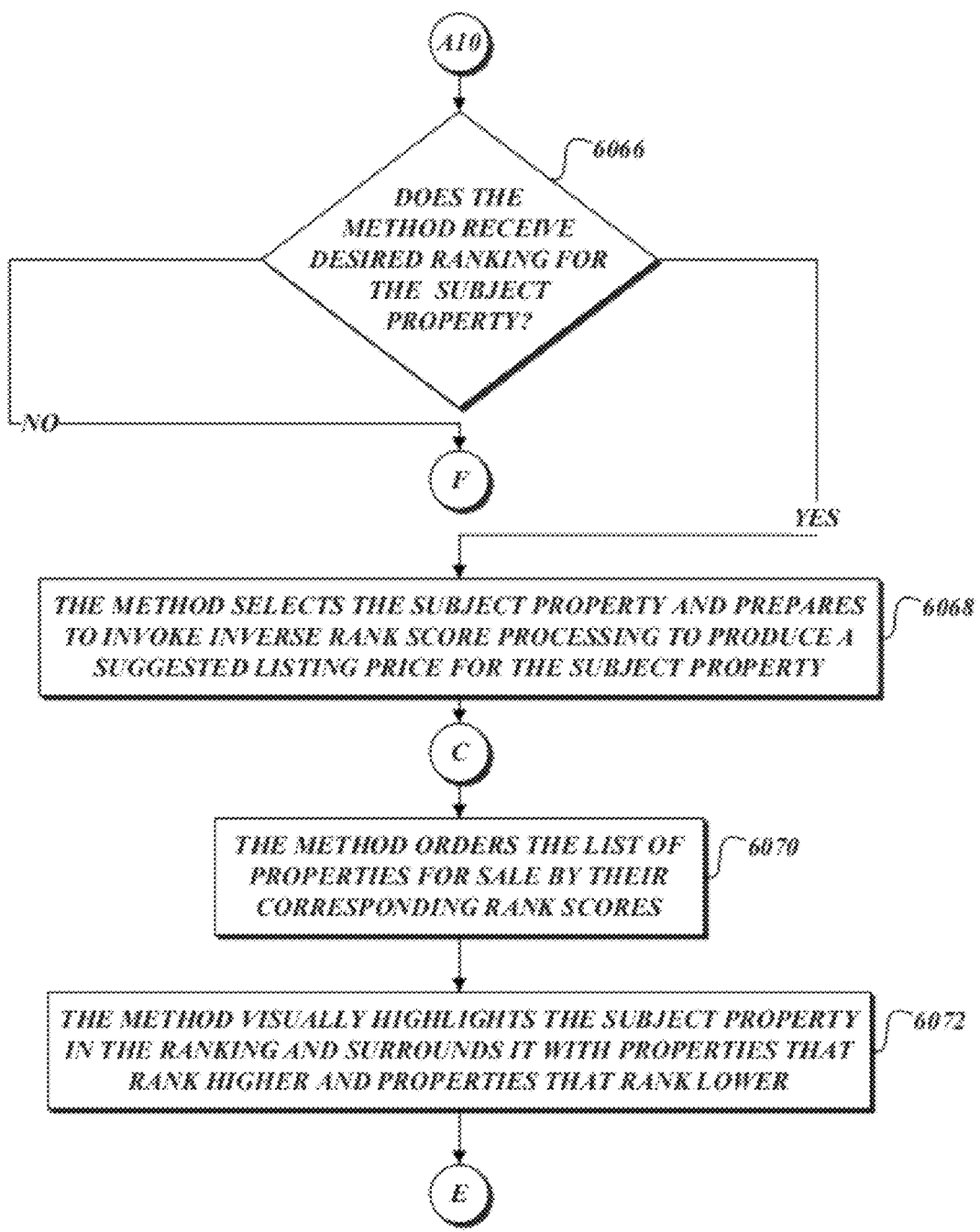
Figure 6J:
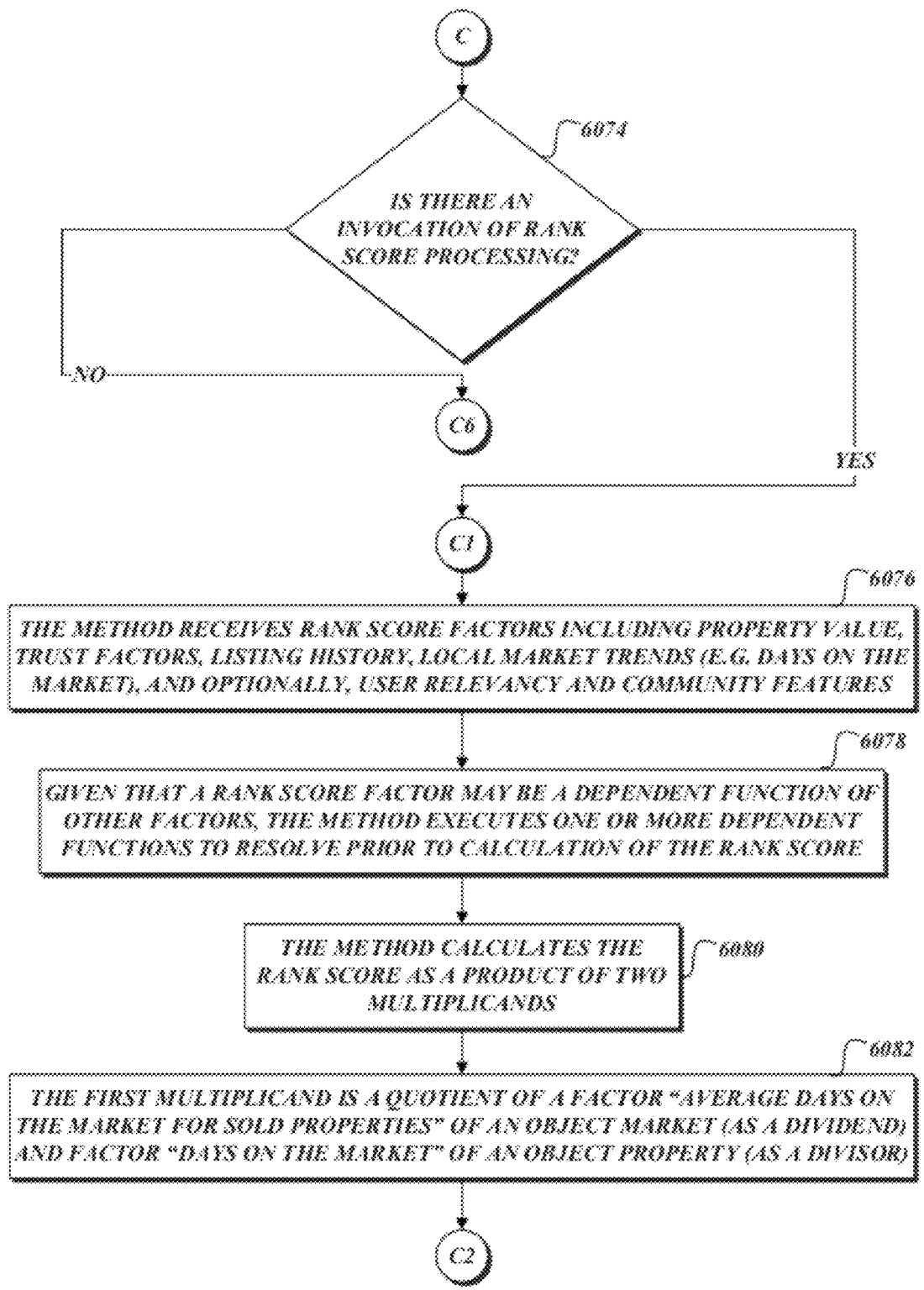
Figure 6K:
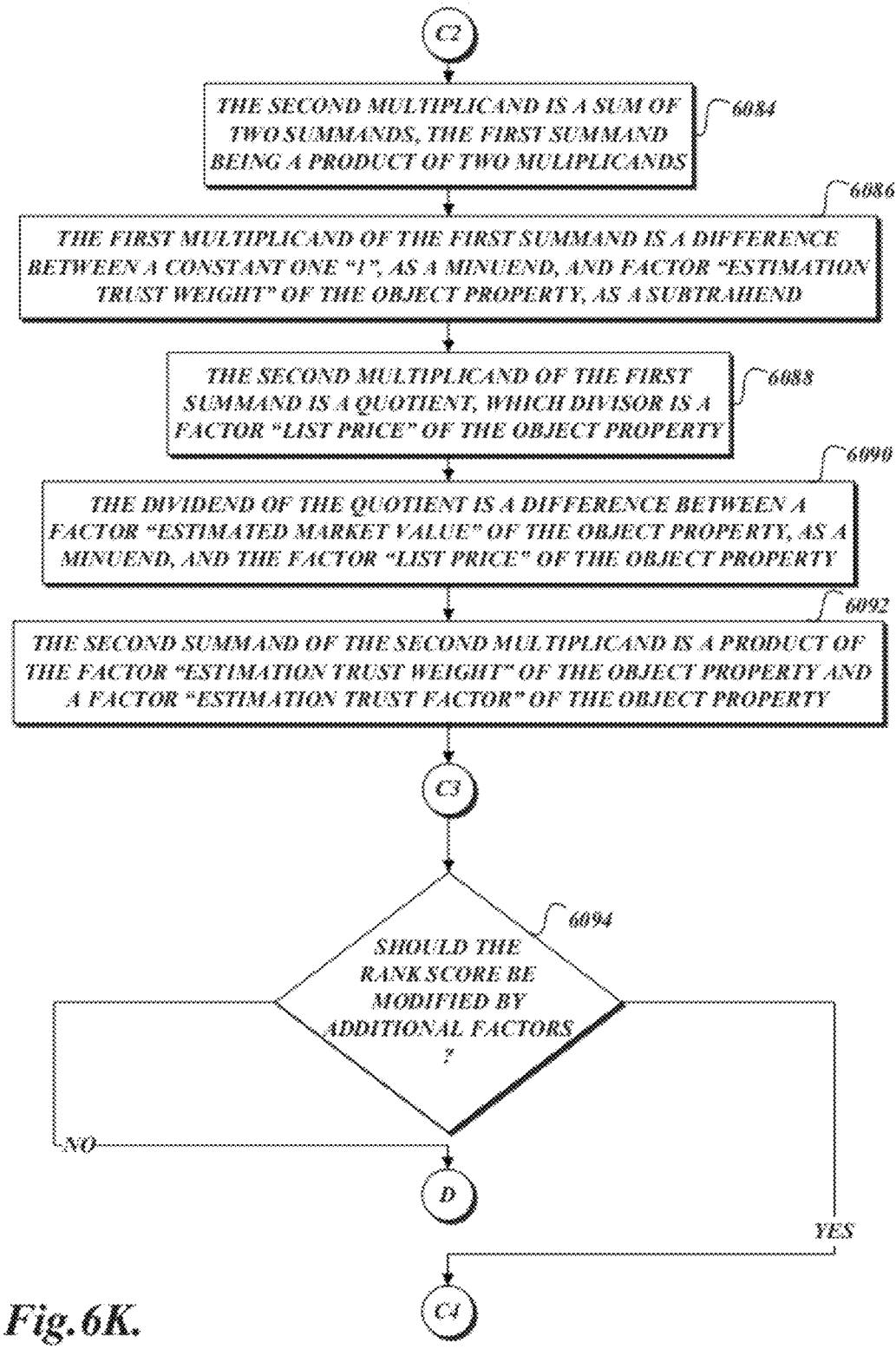
Figure 6L:
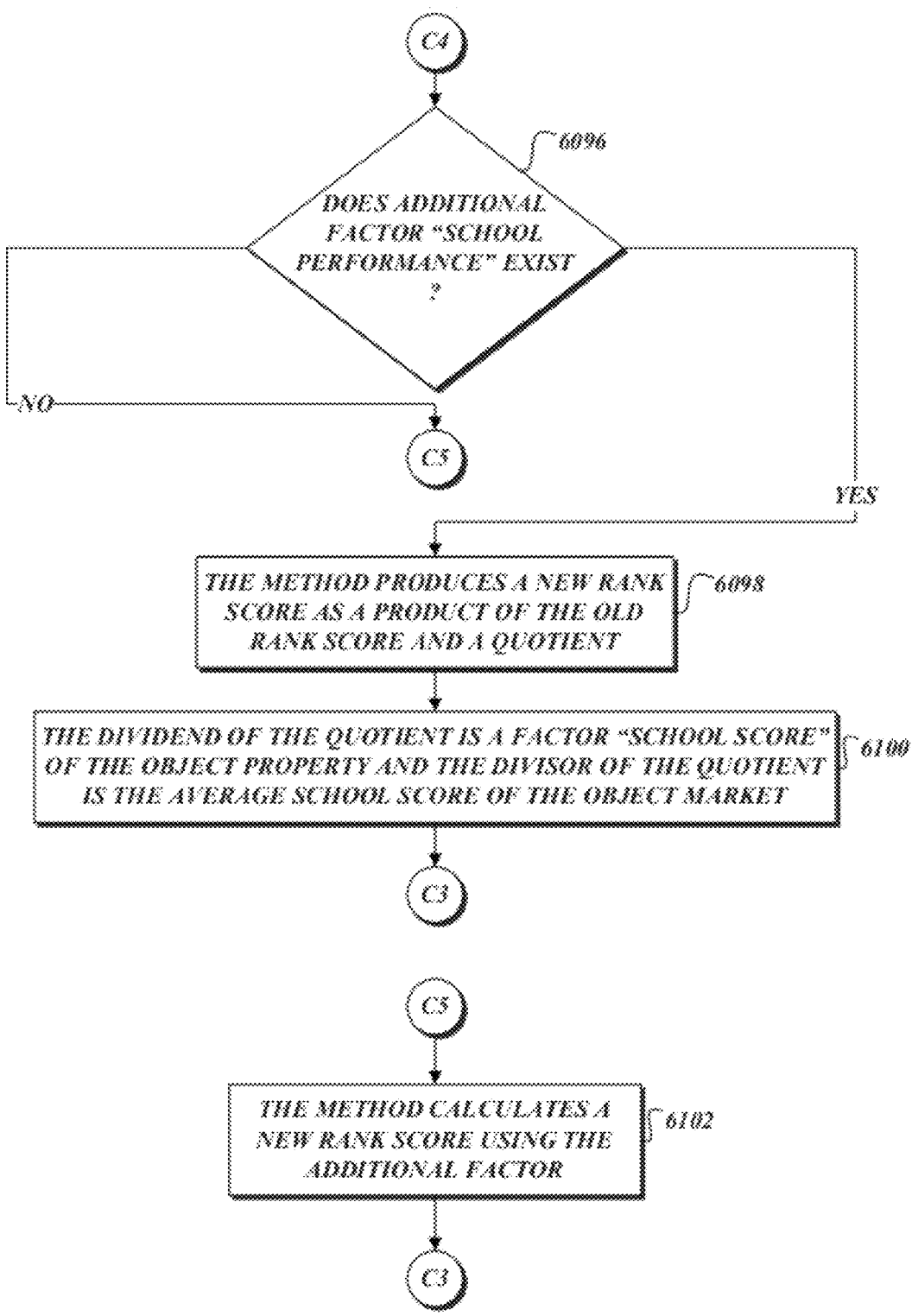
Figure 6M:
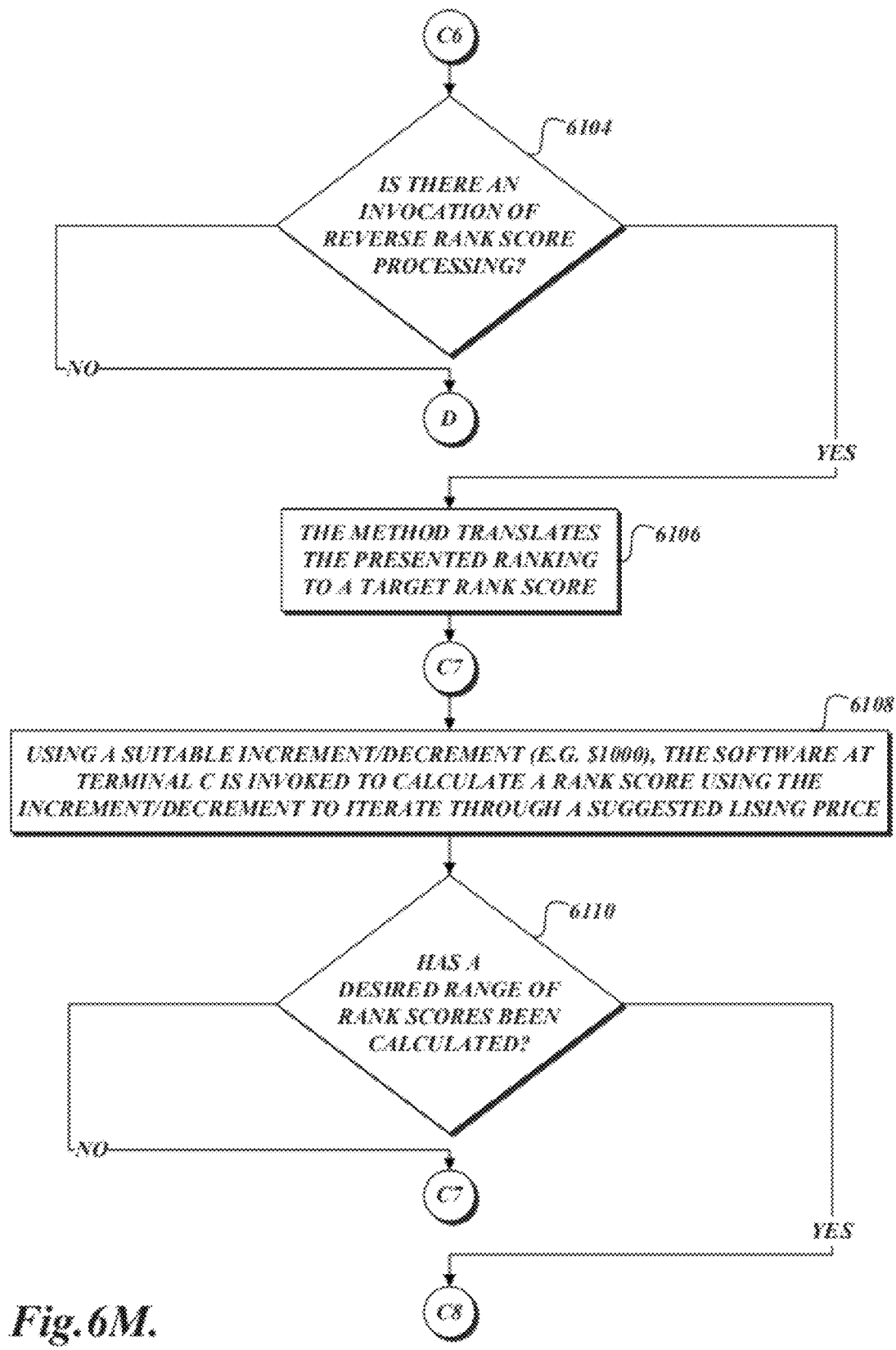
Figure 6N:
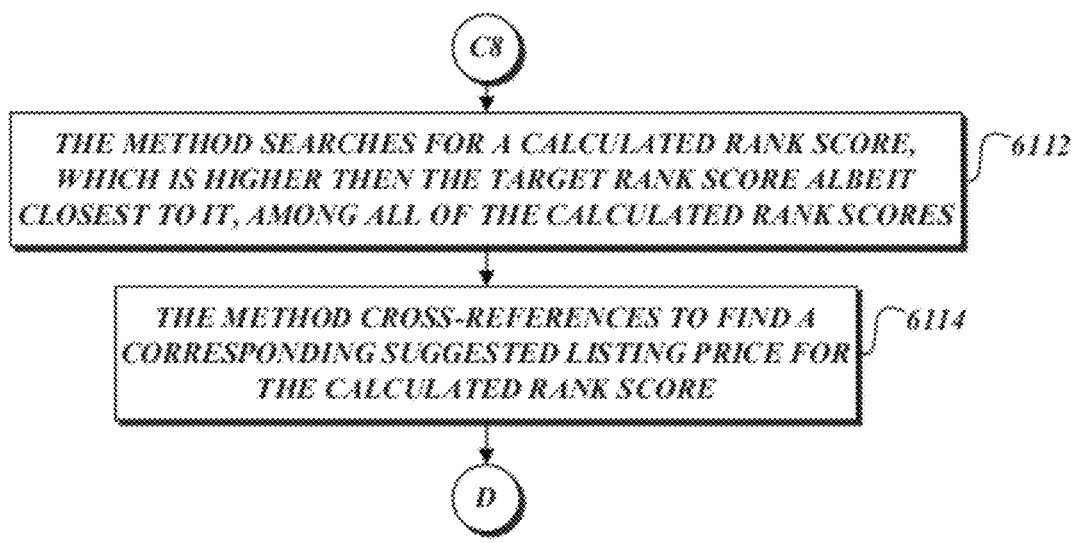

FIGS. 6A-6N illustrate a software method for servicing real estate queries using networked hardware, such as those connected with the system 100 as well as the real estate ranking system 110. From a start block, the method 6000 proceeds to a set of method steps 6002, defined between a continuation terminal ("Terminal A") and an exit terminal ("Terminal B"). The set of method steps 6002 describes receiving a real estate query and processing the real estate query to find one or more real estate properties, which are ranked in accordance with their rank scores. From Terminal A (FIG. 6B), the method proceeds to block 6008 where the method receives a real estate query, such as the real estate query 106. The method then proceeds to decision block 6010 where a test is performed to determine whether the user who sent the query is a buyer. If the answer to the test at decision block 6010 is YES, the method continues to another continuation terminal ("Terminal A1"). Otherwise, the answer to the test at decision block 6010 is NO and the method proceeds to another decision block 6012 where another test is performed to determine whether the user who sent the query is a seller. If the answer to the test at decision block 6012 is YES, the method proceeds to another continuation terminal ("Terminal A7"). Otherwise, the answer to the test at decision block 6012 is NO, and the method proceeds to another continuation terminal ("Terminal F") and terminates execution.

From Terminal A1 (FIG. 6C), the method proceeds to block 6014 where the method processes the query. The method then proceeds to decision block 6016 where a test is performed to determine whether the query is directed to a general property search. If the answer to the test at decision block 6016 is YES, the method proceeds to another continuation terminal ("Terminal A2"). Otherwise, the answer to the test at decision block 6016 is NO, and the method proceeds to another decision block where another test is performed to determine whether the query is directed to a specific property search. See decision block 6018. If the answer to the test at decision block 6018 is YES, the method proceeds to another continuation terminal ("Terminal A4"). Otherwise, the answer to the test at decision block 6018 is NO, and the method proceeds to Terminal F and terminates execution.

From Terminal A2 (FIG. 6D), the method extracts search criteria such as city, zip code, price range, size, construction year, number of rooms, builder quality, lot size, views, number of floors, pools, amenities, and so on. See block 6020. At block 6022, the method executes the search to obtain a list of properties for sale. The method then continues to another continuation terminal ("Terminal A3"). From Terminal A3 (FIG. 6D), the method proceeds to block 6024 where the method extracts one property for sale and prepares to invoke rank score processing to produce a rank score for the one property for sale. The method then continues to another continuation terminal ("Terminal C"). From Terminal C (FIG. 6A), the method proceeds to a set of method steps 6004, defined between Terminal C and an exit terminal ("Terminal D"). The set of method steps 6004 calculates a rank score for a real estate property and afterward returns to the invoking software.

After the set of method steps 6004 is executed, the method returns to decision block 6026 (FIG. 6D), where another test is performed to determine whether there is another property in the list. If the answer to the test at decision block 6026 is YES, the method continues to Terminal A3 and skips back to block 6024 where the above-identified processing steps are repeated. Otherwise, the answer to the test at decision block 6026 is NO, and the method proceeds to block 6028 which orders the list of properties for sale by their corresponding rank scores. The method then continues to another continuation terminal ("Terminal E").

From Terminal E (FIG. 6A), the method proceeds to a set of method steps 6006, defined between Terminal E and Terminal F. The set of method steps 6006 presents the results of the real estate query to a user. Digressing, the set of method steps 6006 orders real estate properties ranked for a real estate user, buyer and/or seller to browse, analyze, filter, and organize as a basis upon which to make decisions. One way to browse, but not limited to it, uses a list representation of real estate properties which displays pictures of real estate properties and their characteristics, such as interior size (number of square feet), year built, number of bedrooms, and number of bathrooms. Another way to browse ranked real estate properties, but also not limited to it, uses a map representation which allows a user to identify properties on the map, zoom in and out, locate properties within a certain radius relative to a known place, and use other mapping tools such as search pivoting.

Throughout the browsing process, the user is facilitated to find more details about the real estate properties of interest, such as historical sales data, marketing information provided by sellers or statistical analysis of real estate transactions in the area. Such information can be provided directly by the system 100 or indirectly by real estate professionals, third-party systems, and companies such as those specialized in marketing and selling real estate properties. The process can continue with visits to selected properties of interest, or the user can come back to refine the selection criteria so as to further browse and organize properties. Ultimately, after viewing properties of interest in person, using real estate professional services, a buyer may eventually decide to make an offer and potentially purchase a desired real estate property.

Returning, from Terminal A4 (FIG. 6E), the method proceeds to block 6030 where the method receives a seller's asking price or other pricing derivations and a unique identifier for the subject real estate such as an address or an assessor parcel number. At block 6032, the method extracts search criteria, such as city, zip code, price range, size, construction year, number of rooms, builder quality, lot size, views, number of floors, pools, amenities, and so on. At block 6034, the method executes the search to obtain a list of properties for sale. The method then continues to another continuation terminal ("Terminal A5"). Proceeding on to block 6036, the method extracts one property for sale and prepares to invoke rank score processing to produce a rank score for the one property for sale. The method then continues to Terminal C and invokes the calculation of rank score by the set of method steps 6004. See FIG. 6A. Upon returning from the invocation of the set of method steps 6004, the method then proceeds to decision block 6038 where a test is performed to determine whether there is another property in the list. If the answer to the test at decision block 6038 is YES, the method proceeds to Terminal A5 and skips back to block 6036 where the above-identified processing steps are repeated. Otherwise, the answer to the test at decision block 6038 is NO, and the method proceeds to another continuation terminal ("Terminal A6").

From Terminal A6 (FIG. 6F), the method proceeds to block 6040 where the method selects the subject real estate and prepares to invoke rank score processing to produce a rank score for the subject real estate. The method then invokes the set of method steps 6004 at Terminal C. Upon finishing execution of the set of method steps 6004, the method returns and proceeds to blocks 6042 where the method orders the list of pieces of real estate for sale by their corresponding rank scores. At block 6044, the method visually highlights the subject real estate in the ranking and surrounds it with properties that rank higher and properties that rank lower. The method then continues to Terminal E where the set of method steps 6006 is executed to present the results of the real estate query to the user.

The set of method steps 6006, in addition to the foregoing discussion, allow users to identify the influence of the value of the subject property relative to other properties on the market. As a result, users can identify how good a deal a certain property on the market would be, relative to desired selection criteria, the asking price and other user inputs. Ultimately, the user has an understanding of the importance and influence of real estate values of a certain property offered on the market, which may not necessarily be its listing price, at a certain point in time and suitably is able to make more educated decisions throughout the real estate buying and selling process.

From Terminal A7 (FIG. 6G), the method proceeds to block 6046 where the method receives a unique identifier for the subject property, such as an address or an assessor parcel number. At block 6048, the method extracts search criteria such as city, zip code, price range, size, construction year, number of rooms, builder quality, lot size, views, number of floors, pools, amenities, and so on. At block 6050, the method executes the search to obtain a list of properties for sale. The method then continues to another continuation terminal ("Terminal A8"). From Terminal A8, the method proceeds to block 6052 where the method extracts one property for sale and prepares to invoke rank score processing to produce a rank score for the one property for sale. The method then proceeds to Terminal C and invokes the set of method steps 6004. Upon finishing the execution of the set of method steps 6004, the method returns and continues to decision block 6054 where a test is performed to determine whether there is another property in the list. If the answer to the test at decision block 6054 is YES, the method proceeds to Terminal A8 and skips back to block 6052 where the above-identified processing steps are repeated. Otherwise, the answer to the test at decision block 6054 is NO, and the method proceeds to another continuation terminal ("Terminal A9").

From Terminal A9 (FIG. 6H), the method proceeds to block 6056 where the method receives further information regarding the subject property, such as current conditions, remodeling details, user-installed features, and so on. The method then proceeds to decision block 6058 where a test is performed to determine whether the method received a hypothetical price for the subject property. If the answer to the test at decision block 6058 is NO, the method proceeds to another continuation terminal ("Terminal A10"). Otherwise, the answer to the test at decision block 6058 is YES and the method proceeds to block 6060 where the method selects the subject property and prepares to invoke rank score processing to produce a rank score for the subject real estate. The method then continues to Terminal C where it invokes the set of method steps 6004. Upon finishing the execution of the set of method steps 6004, the method returns and continues to block 6062 where the method orders the list of properties for sale by their corresponding rank scores. At block 6064, the method visually highlights the subject property in the ranking and surrounds it with properties that rank higher and properties that rank lower. The method then continues to Terminal E.

Digressing, from Terminal E, the method executes the set of method steps 6006. The foregoing processing facilitates the seller to use a "what if" scenario in which he enters a hypothetical list price value for a real estate property (subject property), and the method 6000 determines how the subject property would rank among all other properties for sale, matching a given selection criteria. Previously discussed navigations are available to allow the user to browse through the subject real estate property as well as other ranked real estate properties. The user, through the set of method steps 6006, can compare the subject property with other ranked properties. As part of the process, the user (such as a prospective seller) can go back and change the hypothetical asking price and go through the rest of the process again to determine how the new hypothetical asking price changes the ranking of the subject property among actual properties offered for sale on the market, given the selection criteria. The process can continue again with the analysis and comparison of the ranked properties and may loop through the steps as many times as the user wants to exercise different hypothetical asking prices. Ultimately, after exercising desired hypothetical asking prices for the subject property, the user (such as a prospective seller) may rely on real estate professional services to offer the subject property on the market. The user may come away with a better understanding of the importance and influence of the hypothetical asking price for the subject property if it would be offered on the market at a certain point in time. This allows the prospective seller to make more educated decisions related to selling real estate properties process. Other embodiments are constructed around other scenarios that allow the user (such as a prospective seller of real estate properties) to make the ranking system identify a hypothetical listing price at which the real estate property would be ranked within the top N values for a given search/selection criteria.

Returning, from Terminal A10 (FIG. 6I), the method proceeds to decision block 6066 where a test is performed to determine whether the method received a desired ranking for the subject property. If the answer to the test at decision block 6066 is NO, the method continues to Terminal F and terminates execution. Otherwise, if the answer to the test at decision block 6066 is YES, the method proceeds to block 6068 where the method selects the subject property and prepares to invoke reverse rank score processing to produce a suggested listing price for the subject property. In other embodiments, the reverse rank score processing may be invoked to predict "time to sell" (or days on the market) for a subject property based on historical data gathered around the rank score. For example, if a subject property listed in the City of Bellevue, State of Washington, were at $350,000, and receives a rank score of 0.24, the system 100 knows that 95% of the properties in that city with a similar rank score were sold within 3 weeks. Using this information, the system 100 can predict that this subject property has a 95% probability to sell in fewer than 3 weeks. In addition, the user (seller) can enter into the system 100 a desired "time to sell" value (i.e., 4 weeks) and the system 100 can use the reverse rank score processing to suggest at what listing price would give the seller a 95% probability to sell the subject property within that time frame (i.e., fewer than 4 weeks).

The method continues to Terminal C and invokes the set of method steps 6004. FIGS. 3A-3C pictorially illustrate the processing that occurs here to determines a suggested listing price for a desired ranking for a real estate property. Upon finishing execution of the set of method step 6004, the method returns and continues to block 6070, where the method orders the list of properties for sale by their corresponding rank scores. The method continues to block 6072 where the method visually highlights the subject property in the ranking and surrounds it with properties that rank higher and properties that rank lower. The method then continues to Terminal E.

Digressing, the method executes the set of method steps 6006 at Terminal E. The foregoing discussion facilitates a prospective seller to make the system 100 figure out a listing price at which the property would be ranked within the top N values for a given search criteria, where N is a desired ranking variable. The prospective seller would enter a unique identifier for a real estate property (subject property) and a number that is indicative of a desired ranking. The method 6000 determines a hypothetical asking price that would rank the subject property among the top N properties for sale, matching a given selection criteria.

The set of method steps 6006 facilitate navigation by the user, the prior navigation discussion of which is referenced here, to iteratively determine a desired hypothetical asking price. The user can compare the subject property with other ranked properties. As part of the process, the user (such as a prospective seller) can go back and change the desired value N defining the top N deals or the selection criteria in order to rank the subject property. Then, the user would go through the rest of the process again, figuring how the new value N and/or the new search criteria changes the calculated hypothetical asking price and the pool of ranked properties identified in the top N. The process can continue again with the analysis and comparison of the ranked properties and may loop through the steps as many times as the user prefers to exercise different values for N, different selection criteria and as a result, different hypothetical calculated asking prices. Ultimately, after exercising desired values for N, selection criteria, and calculated hypothetical asking prices for the subject property, the user may rely on real estate professional services to offer the subject property on the market for sale. Therefore, the user has a deeper understanding of the how the hypothetical asking price for the subject property may vary, depending on the intended range of top N deals to be placed in and search criteria, should the subject property be potentially offered on the market at a certain point in time. This allows the prospective seller to make more educated decisions related to the overall process around selling real estate properties.

Returning, from Terminal C (FIG. 6J), the method proceeds to decision block 6074 where a test is performed to determine whether there is an invocation of rank score processing. If the answer to the test at decision block 6074 is NO, the method proceeds to another continuation terminal ("Terminal C6"). Otherwise, if the answer to the test at decision block 6074 is YES, the method continues to another continuation terminal ("Terminal C1"). The method then continues to block 6076 where the method receives rank score factors including property value, trust factors, listing history, local market trends (e.g., days on the market) and optionally, user relevancy and community features. The method then continues to block 6078. Given that a rank score factor may be a dependent function of other factors, the method executes one or more dependent functions to resolve prior to calculation of the rank score. See block 6078. At block 6080, the method calculates the rank score as a product of two multiplicands. Continuing to block 6082, the first multiplicand is a quotient of a factor "average days on the market for sold properties" of an object market (as a dividend) and factor "days on the market" of an object property (as a divisor). The object market represents a local real estate market including but not limited to city, zip code, a given customizable radius or polygon area, and so on. The object property represents a real estate property of interest being assigned a rank score. The method then continues to another continuation terminal ("Terminal C2").

From Terminal C2 (FIG. 6K), the method proceeds to block 6084 where the second multiplicand is a sum of two summands, the first summand being a product of two multiplicands. At block 6086, the first multiplicand of the first summand is a difference between a constant 1 ("one") as a minuend, and factor "estimation trust weight" of the object property, as a subtrahend. At block 6088, the second multiplicand of the first summand is a quotient, which divisor is a factor "list price" of the object property. At block 6090, the dividend of the quotient is a difference between a factor "estimated market value" of the object property, as a minuend, and the factor "list price" of the object property, as a subtrahend. This quotient is a measure of value or equity. The factor "estimated market value" of the real estate property can be obtained using a professional appraisal report or one of the many automated valuation models such as the Quantarium Valuation Model. The method then continues to block 6092 where the second summand of the second multiplicand is a product of the factor "estimation trust weight" of the object property, and a factor "estimation trust factor" of the object property. Each of these factors "estimation trust weight" and "estimation trust factor" has a value between zero "0" and one "1". As a calculated example, suppose a subject property is on the market in the City of Bellevue in the State of Washington for 120 days, where the average time to sell a property is 60 days. The subject property is listed for $400,000 and its estimated market value is $500,000 (with a trust factor of 0.9). Assuming a 20% estimation trust weight, with the difference from 100% going to the equity factor weight, then the rank score for this subject property is calculated to be 0.19.

The method then continues to another continuation terminal ("Terminal C3"). From Terminal C3, the method proceeds to decision block 6094 where a test is performed to determine whether the ranked score should be modified by additional factors. If the answer to the test at decision block 6094 is NO, the method continues to Terminal D and returns to the invoking set of method steps. Otherwise, the answer to the test at decision block 6094 is YES, and the method continues to another continuation terminal ("Terminal C4").

From Terminal C4 (FIG. 6L), the method proceeds to decision block 6096 where a test is performed to determine whether there exists an additional factor "school performance". If the answer to the test at decision block 6096 is NO, the method proceeds to another continuation terminal ("Terminal C5"). Otherwise, the answer to the test at decision block 6096 is YES, and the method proceeds to block 6098 where the method produces a new rank score as a product of the old rank score and a quotient. At block 6100, the dividend of the quotient is a factor "school score" of the object property and the divisor of the quotient is the average school score of the object market. The factor "school score" can be based on the performance of a school that the subject property is assigned to and has values between 0 and 100. Such school scores might be regularly published by various trusted organizations. Using the calculated example discussed above, suppose that the user is looking for a ranked property list, adjusted by school scores relevance. If the subject property is assigned to an elementary school with a performance score of 90 and the average school performance score in the City of Bellevue, State of Washington, is 60, then the rank score above will be adjusted upward to 0.285.

The method then continues to Terminal C3 and skips back to decision block 6094 where the above-identified processing steps are repeated. From Terminal C5 (FIG. 6L), the method proceeds to block 6102 where the method calculates a new rank score using the additional factor. Among many suitable factors, one factor is adapted for a scenario where the real estate buyer is an investor. In that case, the method takes into consideration a factor "investment performance score". This factor "investment performance score" could be general knowledge or it can be calculated. Suppose that an investment performance indicator is called capitalization rate, which is an annual percentage on the investment return, after all expenses are accounted for. Suppose further that someone purchases a "three bedrooms/two baths" property for $100,000 which is to be used as a rental in a market where the typical rent for a similar property is $700/month. If the annual property taxes are $2000 and annual insurance is $400 then the net operating income is $6000 ($700*12−$2000−$400). In this case, the capitalization rate is 6% per year ($6000/$100000). Suppose that this capitalization rate is used as the factor "investment performance score." In that case, the following is an example of how to further refine the rank score: The method 6000 produces a new rank score as a product of the old rank score and a quotient. The old rank score is the computed product produced by the set of method steps from Terminal C to Terminal C2. The dividend of the quotient is a factor "investment performance score" of the object property and the divisor of the quotient is the factor "average return score" of the object market. The factor "investment performance score" includes the capitalization rate of the subject real estate property. The factor "average return score" includes the 10-year U.S. Treasury Securities Yield.

Returning, the method then continues to Terminal C3 and skips back to decision block 6094 where the above-identified processing steps are repeated. From Terminal C6 (FIG. 6M), the method proceeds to decision block 6104 where a test is performed to determine whether there is an invocation of reverse rank score processing. If the answer to the test at decision block 6104 is NO, the method continues to Terminal D and returns to the invoking set of method steps. Otherwise, the answer to the test at decision block 6104 is YES, and the method proceeds to block 6106 where the method translates the presented ranking to a target rank score. FIGS. 3A-3C visually illustrate this step and other below-discussed steps in greater detail. The method then continues to another continuation terminal ("Terminal C7"). From Terminal C7, the method proceeds to block 6108 where, using a suitable increment/decrement (e.g., $1,000), the software at Terminal C, which is the set of method steps 6004, is invoked to calculate a rank score using the increment/decrement to iterate through a suggested listing price. The method then proceeds to decision block 6110 where a test is performed to determine whether a desired range of rank scores had been calculated. If the answer to the test at decision block 6110 is NO, the method proceeds to Terminal C7, and skips back to block 6108 where the above-identified processing steps are repeated. Otherwise, the answer to the test at decision block 6110 is YES, and the method proceeds to another continuation terminal ("Terminal C8").

From Terminal C8 (FIG. 6N), the method proceeds to block 6112 where the method searches for a calculated rank score, which is higher than the target rank score, albeit closest to it, among all the calculated rank scores. At block 6114, the method cross-references to find a corresponding suggested listing price for the calculated rank score. The method then continues to Terminal D and returns to the invoking set of method steps.

The foregoing discussion focuses on buying and/or selling transactions for one or more real estate properties. One skilled in the art would appreciate that such a foregoing discussion would be suitable for renting transactions of one or more real estate properties.

For example, in one embodiment, in lieu of "listing price" factor, one skilled in the art would understand that "listing price" may mean the inclusion of a price at which a real estate property may be leased in addition to a price at which a real estate property may be sold. In such an embodiment, the "estimated market value" represents a rent market value rather than a sale market value. In this same embodiment, the system 100 may produce a rank score for each real estate property in a list of real estate properties that is capable of being sorted by their rental values. In this same vein, a property owner may enter a hypothetical rent listing price and the system 100 can calculate a rank score along with the probability that a real estate property is likely to be rented within a specific time interval.

While illustrative embodiments have been illustrated and described, it will be appreciated that various changes can be made therein without departing from the spirit and scope of the invention.

The embodiments of the invention in which an exclusive property or privilege is claimed are defined as follows:

1. A method for ordering real estate properties, comprising:
    calculating a rank score for each real estate property based on its property value, trust factors, listing history, and local market trends; and
    sorting each real estate property in accordance with its rank score, wherein calculating the rank score includes calculating the rank score as a product of two multiplicands, the first multiplicand being a quotient of a factor "average days on the market for sold properties" of an object market as a dividend and factor "days on the market" of an object property as a divisor, the second multiplicand being a sum of two summands, the first summand being a product of two multiplicands, the first multiplicand of the first summand being a difference between a constant 1 as a minuend and factor "estimation trust weight" of the object property as a subtrahend, the second multiplicand of the first summand being a quotient, which divisor is a factor "list price" of the object property, the dividend of the quotient being a difference between a factor "estimated market value" of the object property, as a minuend, and the factor "list price" of the object property, as a subtrahend, the second summand of the second multiplicand being a product of the factor "estimation trust weight" of the object property, and a factor "estimation trust factor" of the object property.

2. The method of claim 1, wherein the local market trends are selected from a group consisting essentially of the number of days on the market, inventory velocity, and price trends.

3. The method of claim 1, wherein the step of calculating the rank score calculates the rank score based on relevancy factors for a user.

4. The method of claim 1, wherein the step of calculating the rank score calculates the rank score based on community features selected from a group consisting essentially of conditions of schools, as well as demographic, economic, and cultural factors.

5. The method of claim 1, wherein the step of sorting each real estate property in accordance with its rank score includes receiving user input for an address of a subject real estate property and a hypothetical listing price, receiving user input for selection criteria for a subset of real estate properties with which the subject real estate property is ranked, calculating the rank score for each real estate property in the subset of real estate properties, ordering the subset of real estate properties into an ordered list, calculating the rank score for the subject real estate property, and inserting the subject real estate property into a position in the ordered list that corresponds to the rank score of the subject real estate property.

6. The method of claim 5, further generating suggested listing prices for the subject real estate property.

7. The method of claim 6, further comparing the subject real estate property with the real estate properties in the ordered list by displaying the suggested listing prices for the subject real estate property for each ranking in the ordered list.

8. The method of claim 5, further comprising receiving user input that is selected from a group consisting of interior remodeling, installation of a new roof, and expansion of a house.

9. The method of claim 5, further comprising receiving user feedback that is selected from a group consisting of click counts and activities on a web site.

10. The method of claim 1, further calculating a probability that a real estate property will be sold within a time interval by using its rank score and historical data for the number of days on the market for other real estate properties which are ranked in a similar position at the time of sale.

11. The method of claim 1, wherein the property value is calculated by using an automated real estate system that further uses a valuation modeling in combination with other data to rank real estate properties for sale in a market.

12. The method of claim 1, further comprising receiving a profile of a user prior to sorting the real estate properties.

13. The method of claim 1, further comprising receiving foreclosure data about foreclosed properties prior to sorting the real estate properties.

14. The method of claim 1, wherein the step of calculating the rank score calculates the rank score based on investment performance score.

15. A system for ordering real estate properties, comprising: a processor for executing
    an estimated market value calculator configured to calculate real estate value;

a trust factors calculator configured to calculate confidence of the real estate value;

a history of the listing calculator configured to calculate the number of days on the market of a real estate property; and a rank score calculator configured to calculate a rank score for each real estate property based on calculations made by the estimated market value calculator, the trust factors calculator, and the history of the listing calculator, wherein calculating the rank score includes calculating the rank score as a product of two multiplicands, the first multiplicand being a quotient of a factor "average days on the market for sold properties" of an object market as a dividend and factor "days on the market" of an object property as a divisor, the second multiplicand being a sum of two summands, the first summand being a product of two multiplicands, the first multiplicand of the first summand being a difference between a constant 1 as a minuend and factor "estimation trust weight" of the object property as a subtrahend, the second multiplicand of the first summand being a quotient, which divisor is a factor "list price" of the object property, the dividend of the quotient being a difference between a factor "estimated market value" of the object property, as a minuend, and the factor "list price" of the object property, as a subtrahend, the second summand of the second multiplicand being a product of the factor "estimation trust weight" of the object property, and a factor "estimation trust factor" of the object property.

16. A non-transitory computer-readable medium having computer-executable instructions stored thereon for implementing a method for ordering real estate properties, comprising:

calculating a rank score for each real estate property based on its property value, trust factors, listing history, and local market trends; and sorting each real estate property in accordance with its rank score, wherein calculating the rank score includes calculating the rank score as a product of two multiplicands, the first multiplicand being a quotient of a factor "average days on the market for sold properties" of an object market as a dividend and factor "days on the market" of an object property as a divisor, the second multiplicand being a sum of two summands, the first summand being a product of two multiplicands, the first multiplicand of the first summand being a difference between a constant 1 as a minuend and factor "estimation trust weight" of the object property as a subtrahend, the second multiplicand of the first summand being a quotient, which divisor is a factor "list price" of the object property, the dividend of the quotient being a difference between a factor "estimated market value" of the object property, as a minuend, and the factor "list price" of the object property, as a subtrahend, the second summand of the second multiplicand being a product of the factor "estimation trust weight" of the object property, and a factor "estimation trust factor" of the object property.

17. The computer-readable medium of claim 16, wherein the step of calculating the rank score calculates the rank score based on relevancy factors for a user.

18. The computer-readable medium of claim 16, wherein the step of sorting each real estate property in accordance with its rank score includes receiving user input for an address of a subject real estate property and a hypothetical listing price, receiving user input for selection criteria for a subset of real estate properties with which the subject real estate property is ranked, calculating the rank score for each real estate property in the subset of real estate properties, ordering the subset of real estate properties into an ordered list, calculating the rank score for the subject real estate property, and inserting the subject real estate property into a position in the ordered list that corresponds to the rank score of the subject real estate property.

* * * * *